(12) United States Patent
Zhang et al.

(10) Patent No.: US 12,368,575 B2
(45) Date of Patent: Jul. 22, 2025

(54) IMAGE MODEL FILE TRANSMISSION

(71) Applicant: Shanghai Bilibili Technology Co., Ltd., Shanghai (CN)

(72) Inventors: Wei Zhang, Shanghai (CN); Jiangtao Hu, Shanghai (CN); Junhao Hu, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 379 days.

(21) Appl. No.: 18/070,033

(22) Filed: Nov. 28, 2022

(65) Prior Publication Data

US 2023/0208618 A1    Jun. 29, 2023

(30) Foreign Application Priority Data

Dec. 27, 2021   (CN) .......................... 202111615417.5

(51) Int. Cl.
*H04L 9/08*      (2006.01)
*H04N 21/2187*   (2011.01)
*H04N 21/8545*   (2011.01)

(52) U.S. Cl.
CPC ....... *H04L 9/0822* (2013.01); *H04N 21/2187* (2013.01); *H04N 21/8545* (2013.01)

(58) Field of Classification Search
CPC ....... H04L 9/0822; H04L 9/0841; H04L 9/14; H04L 9/0825; H04N 21/2187; H04N 21/8545; H04N 21/26613; H04N 21/2347
See application file for complete search history.

(56) References Cited

U.S. PATENT DOCUMENTS 6,711,264 B1 * 3/2004 Matsumoto ............... H04L 9/14
                                                   380/283
8,291,218 B2 * 10/2012 Garcia ...................... H04L 9/30
                                                   713/168

(Continued)

FOREIGN PATENT DOCUMENTS

CN       110268719 A     9/2019
CN       111079163 A     4/2020

(Continued)

OTHER PUBLICATIONS

Moonkey, "Public key encryption algorithm," May 5, 2021 (7 pages).

*Primary Examiner* — James R Turchen
(74) *Attorney, Agent, or Firm* — MCANDREWS HELD & MALLOY, LTD

(57) ABSTRACT

This application provides an image model file transmission method and computing device. The method includes: receiving an image model file of a first online streamer that is sent by a first client; obtaining a target key, and encrypting the image model file based on the target key to obtain an encrypted image model file; in response to determining that an interaction request for the first online streamer and a second online streamer is received, sending the encrypted image model file to a second client based on an online streamer identifier of the second online streamer that is carried in the interaction request; and in response to determining that a decryption request sent by the second client is received, sending the target key to the second client, where the target key is used by the second client to decrypt the encrypted image model file to obtain the image model file.

17 Claims, 11 Drawing Sheets

(56) References Cited

U.S. PATENT DOCUMENTS

| | | | | |
|---|---|---|---|---|
| 8,370,620 | B2* | 2/2013 | Marivoet | H04L 67/104 |
| | | | | 713/168 |
| 9,733,852 | B2* | 8/2017 | Gauda | G06F 21/6218 |
| 11,199,957 | B1* | 12/2021 | Alvi | H04W 4/02 |
| 11,356,720 | B2* | 6/2022 | Baril | G06Q 50/01 |
| 11,410,359 | B2* | 8/2022 | Hutten | H04L 67/52 |
| 11,632,531 | B1* | 4/2023 | Bryan | H04N 21/4307 |
| | | | | 348/43 |
| 2010/0070858 | A1* | 3/2010 | Morris | H04N 5/445 |
| | | | | 725/39 |
| 2012/0110328 | A1* | 5/2012 | Pate | H04L 63/061 |
| | | | | 713/165 |
| 2012/0173881 | A1* | 7/2012 | Trotter | H04L 9/0894 |
| | | | | 713/189 |
| 2014/0089200 | A1* | 3/2014 | Hazel | G06Q 20/385 |
| | | | | 705/51 |
| 2017/0061092 | A1* | 3/2017 | Baratpour | H04L 65/403 |
| 2020/0357174 | A1 | 11/2020 | Banerjee et al. | |
| 2021/0118231 | A1* | 4/2021 | Hutten | G06F 3/011 |
| 2021/0360197 | A1 | 11/2021 | Oz et al. | |
| 2022/0167022 | A1* | 5/2022 | Bettner | H04N 21/472 |
| 2023/0052325 | A1* | 2/2023 | Katoch | G06F 15/0266 |

FOREIGN PATENT DOCUMENTS

| | | |
|---|---|---|
| CN | 111246225 A | 6/2020 |
| CN | 113420317 A | 9/2021 |

* cited by examiner

Image picture existing before encryption

Encrypted image picture

Decrypted image picture

IMAGE MODEL FILE TRANSMISSION

CROSS-REFERENCE TO RELATED APPLICATION

The present application claims priority to Chinese Patent Application No. 202111615417.5, filed with the China National Intellectual Property Administration on Dec. 27, 2021, which is incorporated herein by reference in its entirety.

TECHNICAL FIELD

This application relates to the field of computer technologies, and in particular, to an image model file transmission method. This application also relates to a computing device and a computer-readable storage medium.

BACKGROUND

With continuous development of computer technologies, livestreaming on a network social platform gradually becomes a popular form of real-time interaction. In the livestreaming field, more online streamers choose to perform livestreaming by using avatars, and livestreaming performed by online streamers by using avatars becomes a new content form in the livestreaming industry. In the livestreaming process, using avatars for interaction between online streamers produces beneficial and positive effects on livestreamed content, user attention to the online streamers, and the like.

SUMMARY

Embodiments of this application provide an image model file transmission method. This application also relates to an image model file transmission apparatus, a computing device, and a computer-readable storage medium.

According to a first aspect of the embodiments of this application, a method is provided. The method is applied to a server and includes:
receiving an image model file of a first online streamer that is sent by a first client;
obtaining a target key, and encrypting the image model file based on the target key to obtain an encrypted image model file;
in response to determining that an interaction request for the first online streamer and a second online streamer is received, sending the encrypted image model file to a second client based on an online streamer identifier of the second online streamer that is carried in the interaction request; and
in response to determining that a decryption request sent by the second client is received, sending the target key to the second client, where the target key is used by the second client to decrypt the encrypted image model file to obtain the image model file.

According to a second aspect of the embodiments of this application, a method is provided. The method is applied to a second client and includes:
receiving an encrypted image model file sent by a server, where the encrypted image model file is obtained by the server by encrypting an image model file of a first online streamer based on a target key;
generating a decryption request based on the encrypted image model file, and sending the decryption request to the server; and
decrypting the encrypted image model file based on the target key sent by the server based on the decryption request, to obtain the image model file.

According to a third aspect of the embodiments of this application, a computing device is provided. The computing device is applied to a second client and includes: one or more processors, and a memory storing one or more programs configured to be executed by the one or more processors, the one or more programs including instructions for receiving an encrypted image model file sent by a server, wherein the encrypted image model file is obtained by the server by encrypting an image model file of a first online streamer based on a target key; generating a decryption request based on the encrypted image model file, and sending the decryption request to the server; and decrypting the encrypted image model file based on the target key sent by the server based on the decryption request, to obtain the image model file.

According to a fourth aspect of the embodiments of this application, a computing device is provided and includes one or more processors; a memory storing one or more programs configured to be executed by the one or more processors, the one or more programs including instructions for implementing the steps of the above method.

According to a fifth aspect of the embodiments of this application, a non-transient computer-readable storage medium storing one or more programs is provided. The one or more programs includes instructions, which when executed by one or more processors of an electronic device, cause the electronic device to implement the steps of the above method.

DESCRIPTION OF EMBODIMENTS

Figure 1:
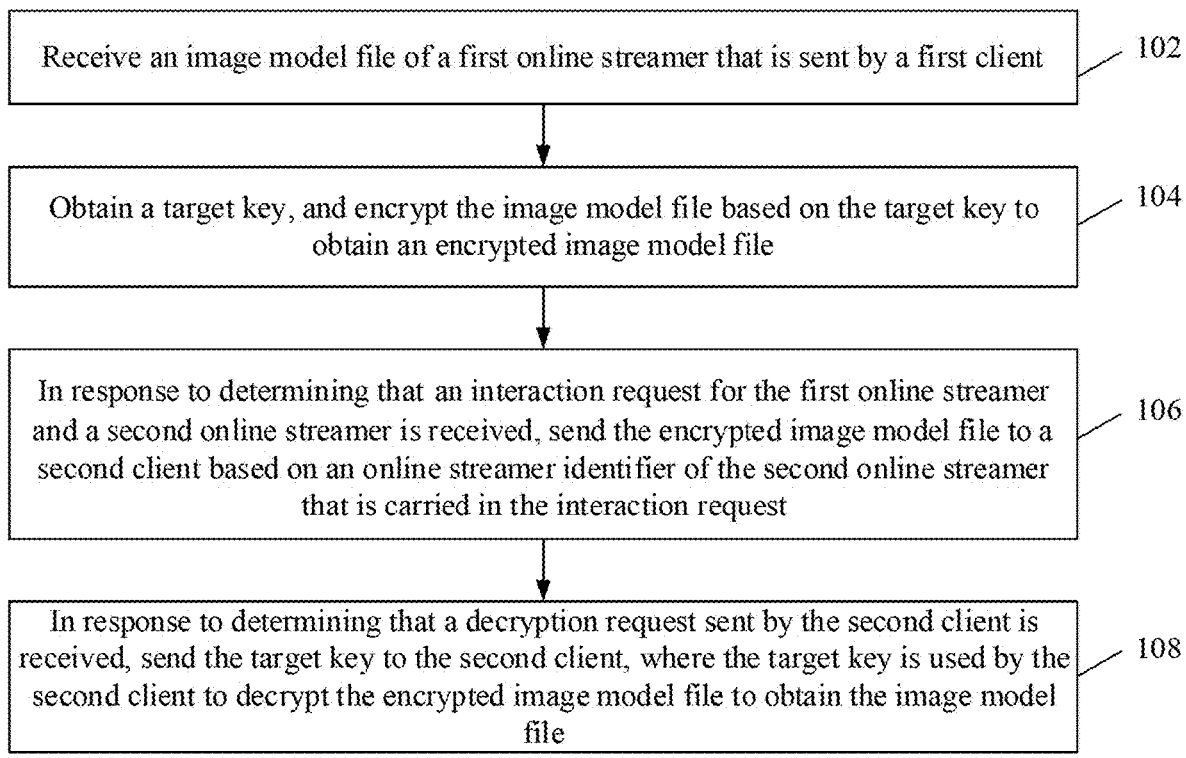
FIG. 1 is a flowchart illustrating an image model file transmission method according to an embodiment of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" may be used in one or more embodiments of this application to describe various types of information, the information is not limited to these terms. These terms are only used to differentiate between information of the same type. For example, without departing from the scope of one or more embodiments of this application, "first" may also be referred to as "second", and similarly, "second" may also be referred to as "first". Depending on the context, for example, the word "i" used herein can be explained as "while", "when", or "in response to determining".

Nouns related to one or more embodiments of this application are first explained.

Live2D is a drawing and rendering technology applied to video games.

A Live2D file is an animation model file of the Live2D rendering technology.

Elliptic Curve Diflie-Hellman Key Exchange (ECDH) is a key exchange protocol used to establish secure shared encrypted data in an insecure channel.

The Advanced Encryption Standard (AES) is a symmetric encryption algorithm.

The Advanced Encryption Standard-Galois/Counter Mode (AES-GCM) is used. The GCM is a counter (CTR) mode used for the symmetric encryption, features a Gigabit network media access control (GMAC) message authentication code and a counter mode, and ensures confidentiality, integrity, and authenticity of data. In addition, the GCM can provide integrity check on an additional message.

RSA is an asymmetric encryption algorithm using an encryption key and a decryption key that are different.

An intellectual property (IP) image mainly includes a copyright, a patent, and a trademark.

Hardware decoding means performing decoding by using a GPU, which consumes quite small CPU performance.

Transparency represents a color of transparency (A) of a picture.

ARGB values are transparency (Alpha, A), red (Red, R), green (Green, G), and blue (Blue, B) values of a picture.

RGB values are red (Red, R), green (Green, G), and blue (Blue, B) values of a picture.

FFmpeg is open source-software, which can run functions of recording, conversion, composition, and the like of a plurality of audio and video formats. The name of FFmpeg comes from the video coding standard named Moving Picture Experts Group (MPEG). "FF" represents "Fast Forward". FFmpeg is a set of open-source computer programs that can be used to record digital audio and videos and convert the digital audio and videos into streams.

Texture sampling is an operation of collecting one pixel color from a picture.

Then the image model file transmission method provided in this application is described.

Currently, livestreaming performed by online streamers by using avatars is a new content form in the fiercely competitive livestreaming industry. In the livestreaming process, interaction between a plurality of online streamers may produce a positive effect of 1+1>2 on content. This is of great help to the content ecology, revenue capabilities of the online streamers, and the like. In virtual services, interaction manners between friends and virtual groups (or guilds), for example, a co-hosting and PK, are favored by online streamers. However, currently, the co-hosting capability is held by the guild and cannot be well assigned to more top online streamers and less popular online streamers because of privacy of avatars (most of which need to be downloaded), the difficulty in technical implementation, and cost issues.

In terms of technology, a solution of localizing an avatar is mainly used for interaction between online streamers: After an interaction connection succeeds, the online streamer downloads an avatar resource of an interactive object and performs face capture. Data is synchronized by using a signaling transmission link, to reduce traffic of video push and ensure definition. Later expansibility is relatively high, and compatibility is good. However, in the foregoing method, at an initial stage of interaction between online streamers, the two online streamers need to exchange respective image model files, which is risky. Specifically, after online streamers are successfully connected to each other for interaction, avatar resources of the interaction parties need to be downloaded, in other words, a plurality of online streamers need to exchange respective avatars with each other, which is risky. That is, the largest disadvantage of localizing the avatar is that the security of the avatar of the online streamer is low, and the avatar is susceptible to leakage and is likely to be stolen by other users, impairing rights and interests of the online streamer. For example, an online streamer w may extract and obtain an image model file of an online streamer u from a memory. This is a loss for the online streamer u. That is, an IP image of the online streamer is prone to leakage, and may be stolen by an unauthorized user, and rights and interests of the owner of the IP image are impaired.

Therefore, in the image model file transmission method provided in this application, an image model file of a first online streamer that is sent by a first client is first received. Then a target key is obtained, and the image model file is encrypted based on the target key to obtain an encrypted image model file. If an interaction request for the first online streamer and a second online streamer is received, the encrypted image model file is sent to a second client based on an online streamer identifier of the second online streamer that is carried in the interaction request. The target key is sent to the second client when a decryption request sent by the second client is received. The target key is used by the second client to decrypt the encrypted image model file to obtain the image model file. The image model file is encrypted, so that all image model files stored in a memory are encrypted files, which ensures that the image model file of the online streamer in the memory cannot be obtained and is securely used in the second client, thereby effectively reducing a risk of leakage of the image model file of the online streamer and improving the security of transmitting the image model file. A server completes encrypting the image model file before receiving the interaction request instead of encrypting the image model file after receiving the interaction request, so that the server can send the image model file to the second client immediately after receiving the interaction request. In this way, response efficiency of the second client can be improved, and a timely response effect of livestreaming can be achieved. In addition, the image model file of the first online streamer is encrypted once being received instead of being encrypted after the interaction request is received, so that sufficient time can be provided for the encryption process, and encryption can be performed by using an encryption algorithm with a relatively high degree of encryption, to increase the difficulty in decoding the image model file, thereby further reducing a risk of leakage of the image model file of the online streamer and improving the security of transmitting the image model file. The encrypted image model file and the target key are separately sent, and the server sends the target key only when the second client sends the decryption request, so that the target key is dynamically managed, and the difficulty in decoding the image model file is further increased. In addition, it is easy to use the method provided in this application, and transformation costs of clients are reduced.

This application provides an image model file transmission method. This application also relates to an image model file transmission apparatus, a computing device, and a computer-readable storage medium. The image model file transmission method, the image model file transmission apparatus, the computing device, and the computer-readable storage medium are described in detail in the following embodiments one by one.

FIG. 1 is a flowchart illustrating an image model file transmission method according to an embodiment of this application. The method is applied to a server and specifically includes the following steps.

Step 102: Receive an image model file of a first online streamer that is sent by a first client.

Specifically, an online streamer is a person who participates in a series of operations such as planning, editing, recording, production, and audience interaction and serves as a host in an Internet program or activity. The first online streamer is any online streamer. In some embodiments, the first online streamer is any online streamer who performs livestreaming by using an avatar or an image of an unreal person. The first client is a client used by the first online streamer, and may be any intelligent device such as a mobile phone, a tablet computer, or an intelligent computer. The image model file refers to resources such as a picture and a model used to form an avatar of the first online streamer.

In actual applications, after an online streamer selects, on an upload interface by using a client used by the online streamer, an image model file that needs to be uploaded by the online streamer and is used to construct an image of the online streamer, and clicks "OK" or any key confirming that the image model file is to be uploaded, the client sends the image model file of the online streamer to the server. That is, the first client sends the image model file of the first online streamer to the server, and the server receives the image model file of the first online streamer sent by the first client.

For example, a game streamer selects, from a local database by using an upload interface of a livestreaming platform, an image model file MX corresponding to an avatar to be displayed by the game streamer, and then adds the image model file MX to the upload interface and clicks a key confirming that the image model file MX is to be uploaded, and the livestreaming platform uploads the image model file MX to the server.

It should be noted that the image model file may include an image picture and an image model, and the image model may be two-dimensional or three-dimensional. This is not limited in this application.

Step 104: Obtain a target key, and encrypt the image model file based on the target key to obtain an encrypted image model file.

In addition to receiving the image model file of the first online streamer that is sent by the first client, the target key is obtained, and the image model file is encrypted based on the target key to obtain the encrypted image model file.

Specifically, the key is a parameter, and specifically, is a parameter input to an algorithm of converting a plaintext into a ciphertext or converting a ciphertext into a plaintext. The target key is a key for the image model file. The encrypted image model file is an image model file obtained after the encryption. Encryption is a process of changing original information data by using a special algorithm.

In actual applications, the server may obtain the target key, and then process the image model file based on the target key, in other words, encrypt the image model file based on the target key, to obtain an encrypted image picture corresponding to the image picture.

In addition, to increase a transmission speed of the image model file in the transmission process and reduce transmission duration, the image model file may be compressed. That is, before the image model file is encrypted based on the target key to obtain the encrypted image model file, the method further includes:

scaling picture data in the image model file to obtain an updated image model file.

Correspondingly, the encrypting the image model file based on the target key to obtain an encrypted image model file includes:

encrypting the updated image model file based on the target key to obtain the encrypted image model file.

Specifically, scaling is a process of reducing a data amount of picture data by changing some formats of the picture data.

In actual applications, the picture data in the image model file may be scaled based on a preset scaling rule, to reduce a packet site of the image model file to obtain the updated image model file, and the updated image model file is encrypted based on the target key to obtain the encrypted image model file.

For example, if a size of the picture data in the image model file is 3 M, the picture data is compressed to obtain 100 k picture data, and the 100 k picture data and non-picture data in the image model file constitute the updated image model file. Then the image model file corresponding to the 100 k picture data is encrypted based on the target key, in other words, the updated image model file is encrypted to obtain the encrypted image model file.

In one or more embodiments of this application, to increase a speed at which a second client loads the image model file, picture data may be scaled based on one or more common application scenarios, to send differently scaled image model files based on different application scenarios of the second client. That is, a specific implementation process of scaling the picture data in the image model file to obtain the updated image model file may be as follows:

obtaining a preset scaling specification table, where the preset scaling specification table includes at least one scaling specification; and scaling the picture data in the image model file by using the scaling specification, to obtain the image model file updated after the picture data is scaled.

Specifically, the scaling specification is a criterion for scaling the picture data, so that scaled picture data meets the scaling specification. The preset scaling specification table is a set of scaling specifications.

In actual applications, for different application scenarios of the second client, for example, different resolution of a display of the second client and different screen sizes of the second client, at least one common scaling specification is preset, and then the picture data is scaled for each scaling specification to obtain scaled picture data corresponding to each scaling specification. In other words, scaling specifications are in a one-to-one correspondence with scaling of the picture data, and a quantity of scaling specifications is the same as a quantity of times of scaling the picture data. In addition to obtaining the scaled picture data, the updated image model file of the scaled picture data is obtained.

For example, the preset scaling specification table is a resolution specification table, and the preset scaling specification table includes four scaling specifications, namely, four resolution specifications: 512*512, 1024*1024, 2048*2048, and 4096*4096. In this case, the picture data in the image model file is scaled based on 512*512, 1024*1024, 2048*2048, and 4096*4096 scaling specifications to obtain picture data of 512*512 resolution, picture data of 1024*1024 resolution, picture data of 2048*2048 resolution, and picture data of 4096*4096 resolution. The picture data of resolution 512*512 corresponds to one updated image model file, the picture data of resolution 1024*1024 corresponds to one updated image model file, the picture data of resolution 2048*2048 corresponds to one updated image model file, and the picture data of resolution 4096*4096 corresponds to one updated image model file.

To further improve the security of transmitting the image model file and increase the difficulty in decoding the encrypted image model file, the image model file may be encrypted twice, that is, first encryption processing is performed on the image model file based on a preset obfuscated encryption algorithm, and second encryption processing is performed on the image model file based on a preset symmetric encryption algorithm. That is, when the target key includes an obfuscation key and a symmetric key, a specific implementation process of encrypting the image model file based on the target key to obtain the encrypted image model file may be as follows:

obtaining a preset obfuscated encryption algorithm and an obfuscation key, and performing first encryption processing on the image model file based on the preset obfuscated encryption algorithm and the obfuscation key to obtain an intermediate image model file; and obtaining a preset symmetric encryption algorithm and a symmetric key, and performing second encryption processing on the intermediate image model file based on the preset symmetric encryption algorithm and the symmetric key to obtain the encrypted image model file.

Specifically, obfuscation is an encryption operation that makes a relationship between a key and a ciphertext (the image model file) as ambiguous as possible. The obfuscation key is a key corresponding to obfuscation, and may be a string such as one or a combination of numbers, letters, and symbols, or may be in the form of a matrix or an array. The preset obfuscated encryption algorithm is an obfuscated encryption algorithm that is set in advance, and may be an exclusive-OR obfuscated encryption algorithm, an AND obfuscated encryption algorithm, or the like. This is not limited in this application. The symmetric encryption algorithm is an encryption method using a single-key cryptosystem. The same key may be used to encrypt and decrypt information. The symmetric encryption algorithm is also referred to as single-key encryption. The preset symmetric encryption algorithm is a symmetric encryption algorithm that is set in advance, and may be the Data Encryption Standard (DES) algorithm, or may be the Advanced Encryption Standard (AES) algorithm. This is not limited in this application. The symmetric key is a key corresponding to the preset symmetric encryption algorithm.

In actual applications, the target key may include the obfuscation key and the symmetric key. The preset obfuscated encryption algorithm and the obfuscation key corresponding to the image model file may be first obtained, and then the image picture in the image model file is read. Then a color value of each pixel in the image picture is encrypted by using the preset obfuscated encryption algorithm based on the obfuscation key, to generate the intermediate image model file obtained by encrypting the image picture. Then the preset symmetric encryption algorithm and the symmetric key corresponding to the image model file are obtained, and the intermediate image model file is encrypted by using the preset symmetric encryption algorithm based on the symmetric key, to obtain the encrypted image model file.

In some embodiments, when the color value includes transparency and a chrominance value, the encrypting a color value of each pixel in the image picture by using the preset obfuscated encryption algorithm based on the obfuscation key may be: starting from the ith pixel in the image picture, performing an exclusive OR operation on transparency of the ith pixel in the image picture and a value of the $(2i-1)$th bit in the target obfuscation key to obtain encrypted transparency of the ith pixel, where i=1; performing an exclusive OR operation on a chrominance value of the ith pixel in the image picture and a value of the $(2i)$th bit in the target obfuscation key to obtain an encrypted chrominance value of the ith pixel; obtaining an encrypted color value of the ith pixel based on the encrypted transparency and the encrypted chrominance value of the ith pixel; determining whether the ith pixel in the image picture is the last pixel; and if no, increasing i by 1, and re-performing the step of performing an exclusive OR operation on transparency of the ith pixel in the image picture and a value of the $(2i-1)$th bit in the target obfuscation key.

Specifically, the transparency is used to indicate how transparent a pixel is, and the greater the transparency, the more transparent the pixel is. The chrominance value is a value corresponding to a color when a pixel is displayed, for example, an RGB value.

In actual applications, the first pixel in the image picture is first selected, and then transparency and a chrominance value of the first pixel are determined. Then an exclusive OR operation is performed on a value of the first bit in the target obfuscation key and the transparency of the first pixel to obtain encrypted transparency of the first pixel, an exclusive OR operation is performed on a value of the second bit in the target obfuscation key and the chrominance value of the first pixel to obtain an encrypted chrominance value of the first pixel, and an encrypted color value of the first pixel is obtained based on the encrypted transparency and the encrypted chrominance value of the first pixel. Further, the second pixel in the image picture is selected, and transparency and a chrominance value of the second pixel are determined. Then an exclusive OR operation is performed on a value of the third bit in the target obfuscation key and the transparency of the second pixel to obtain encrypted transparency of the second pixel, an exclusive OR operation is performed on a value of the fourth bit in the target obfuscation key and the chrominance value of the second pixel to obtain an encrypted chrominance value of the second pixel, and an encrypted color value of the second pixel is obtained based on the encrypted transparency and the encrypted chrominance value of the second pixel. The process is repeated until an encrypted color value of the last pixel in the image picture is determined. In this way, the image picture can be encrypted at a finer granularity in the manner of encrypting the transparency and the chrominance value, so that a difference between the encrypted image picture and the image picture is further increased, thereby improving the security of transmitting the image picture.

In some embodiments, when the color value includes transparency, a first chrominance value, a second chrominance value, and a third chrominance value, the encrypting a color value of each pixel in the image picture by using the preset obfuscated encryption algorithm based on the obfuscation key may be: starting from the jth pixel in the image picture, performing an exclusive OR operation on transparency of the jth pixel in the image picture and a value of the (4j−3)th bit in the target obfuscation key to obtain encrypted transparency of the jth pixel, where j=1; performing an exclusive OR operation on a first chrominance value of the jth pixel in the image picture and a value of the (4j−2)th bit in the target obfuscation key to obtain an encrypted first chrominance value of the jth pixel; performing an exclusive OR operation on a second chrominance value of the jth pixel in the image picture and a value of the (4j−1)th bit in the target obfuscation key to obtain an encrypted second chrominance value of the jth pixel; performing an exclusive OR operation on a third chrominance value of the jth pixel in the image picture and a value of the (4j)th bit in the target obfuscation key to obtain an encrypted third chrominance value of the jth pixel; obtaining an encrypted color value of the jth pixel based on the encrypted transparency, the encrypted first chrominance value, the encrypted second chrominance value, and the encrypted third chrominance value of the jth pixel; determining whether the jth pixel in the image picture is the last pixel; and if no, increasing j by 1, and re-performing the step of performing an exclusive OR operation on transparency of the jth pixel in the image picture and a value of the (4j−3)th bit in the target obfuscation key.

Specifically, the transparency is used to indicate how transparent a pixel is, and the greater the transparency, the more transparent the pixel is. The first chrominance value, the second chrominance value, and the third chrominance value are values respectively corresponding to red, green, and blue when a pixel is displayed, in other words, the first chrominance value, the second chrominance value, and the third chrominance value are respectively an R value, a G value, and a B value.

In actual applications, the first pixel in the image picture may be first selected, and then transparency, a first chrominance value, a second chrominance value, and a third chrominance value of the first pixel may be determined. Then an exclusive OR operation is performed on a value of the first bit in the target obfuscation key and the transparency of the first pixel to obtain encrypted transparency of the first pixel, an exclusive OR operation is performed on a value of the second bit in the target obfuscation key and the first chrominance value of the first pixel to obtain an encrypted first chrominance value of the first pixel, an exclusive OR operation is performed on a value of the third bit in the target obfuscation key and the second chrominance value of the first pixel to obtain an encrypted second chrominance value of the first pixel, an exclusive OR operation is performed on a value of the fourth bit in the target obfuscation key and the third chrominance value of the first pixel to obtain an encrypted third chrominance value of the first pixel, and an encrypted color value of the first pixel is obtained based on the encrypted transparency, the encrypted first chrominance value, the encrypted second chrominance value, and the encrypted third chrominance value of the first pixel. Further, the second pixel in the image file is selected, and transparency, a first chrominance value, a second chrominance value, and a third chrominance value of the second pixel are determined. Then an exclusive OR operation is performed on a value of the fifth bit in the target obfuscation key and the transparency of the second pixel to obtain encrypted transparency of the second pixel, an exclusive OR operation is performed on a value of the sixth bit in the target obfuscation key and the first chrominance value of the second pixel to obtain an encrypted first chrominance value of the second pixel, an exclusive OR operation is performed on a value of the seventh bit in the target obfuscation key and the second chrominance value of the second pixel to obtain an encrypted second chrominance value of the second pixel, an exclusive OR operation is performed on a value of the eighth bit in the target obfuscation key and the third chrominance value of the second pixel to obtain an encrypted third chrominance value of the second pixel, and an encrypted color value of the second pixel is obtained based on the encrypted transparency, the encrypted first chrominance value, the encrypted second chrominance value, and the encrypted third chrominance value of the second pixel. The process is repeated until an encrypted color value of the last pixel in the image picture is determined. In this way, the image picture can be encrypted at a finer granularity in the manner of encrypting the transparency, the first chrominance value, the second chrominance value, and the third chrominance value, so that a difference between the encrypted image picture and the image picture is further increased, thereby improving the security of transmitting the image picture.

Figure 2:
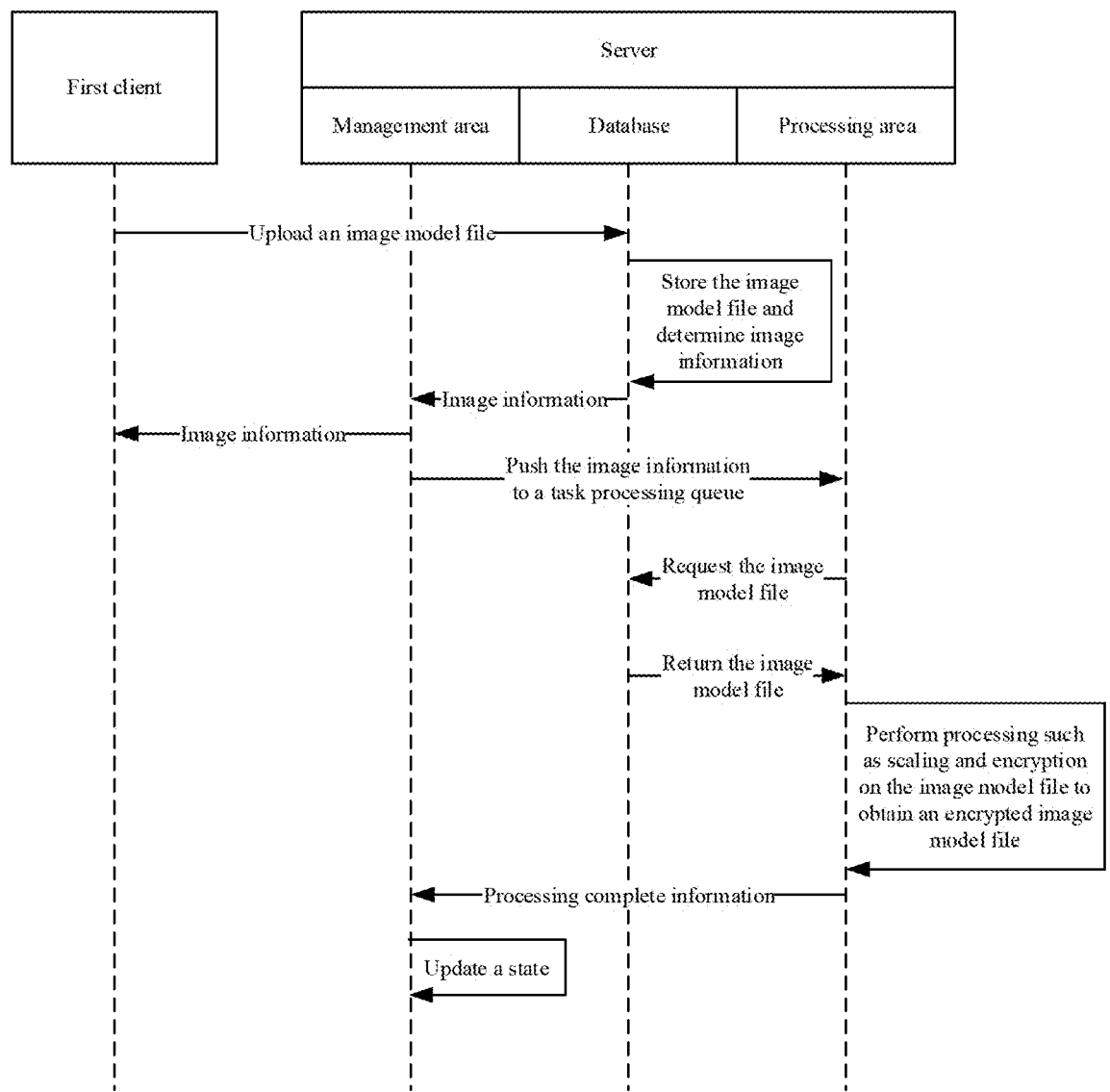
FIG. 2 is a flowchart illustrating an image model file uploading method in an image model file transmission method according to an embodiment of this application.

FIG. 2 is a flowchart illustrating an image model file uploading method in an image model file transmission method according to an embodiment of this application. A server includes a management area, a database, and a processing area. A first client uploads an image model file of a first online streamer to the server after receiving the image model file. The server stores the image model file and determines image information by using the database. The image information is information determined by the database based on the image model file, and includes a unique identifier, namely, a unique image identifier, of the image model file. The database transmits the image information to the management area of the server, the management area returns the image information to the first client, and the management area pushes the image information to a task processing queue for processing by the processing area. The processing area requests the image model file from the database based on the image information, and then the database returns the image information to the processing area. The processing area performs processing such as scaling and encryption on the image model file to obtain an encrypted image model file. Then processing complete information is sent/received and a state is updated.

Figure 3:
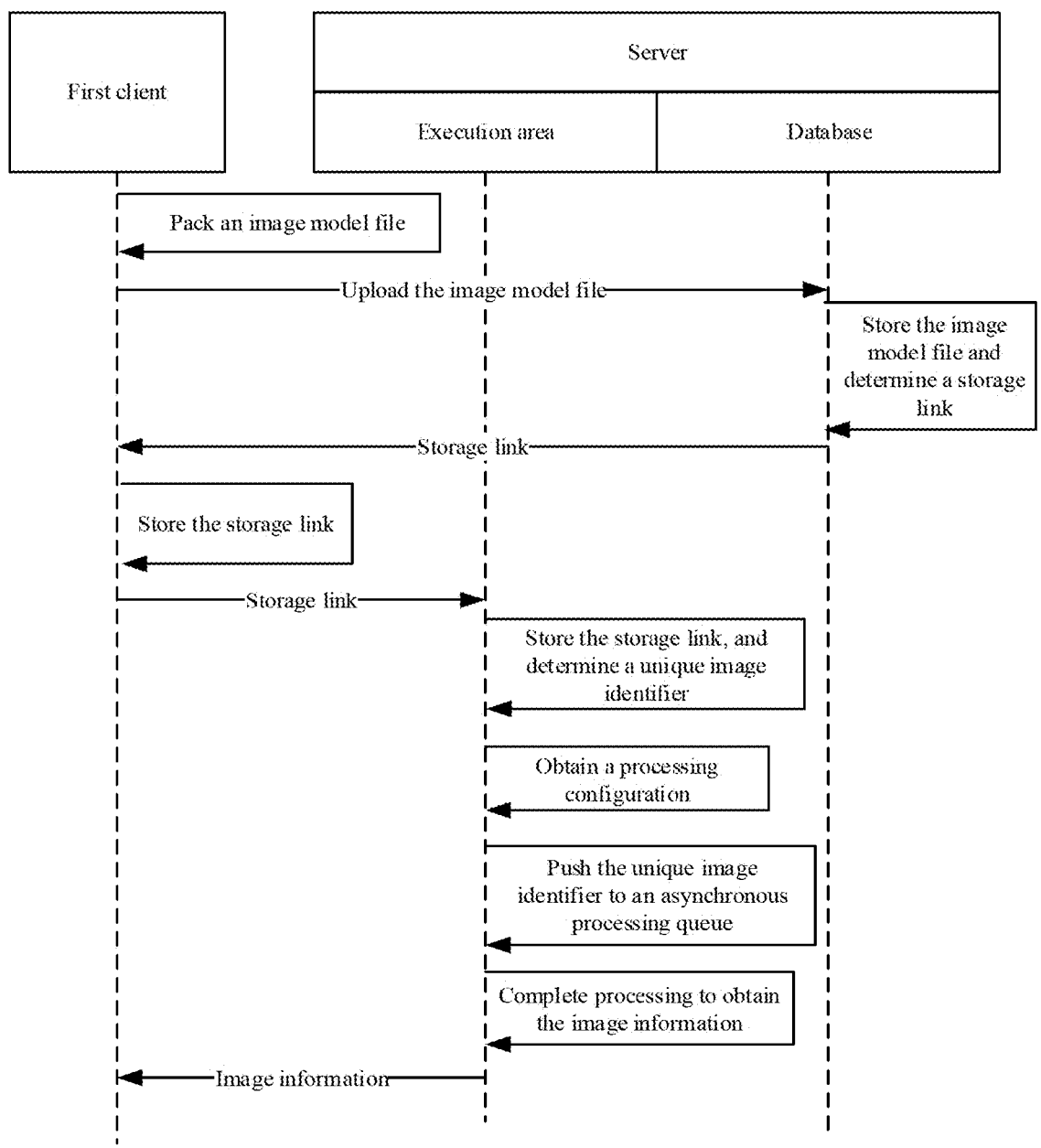
FIG. 3 is a flowchart illustrating an image model file uploading method in another image model file transmission method according to an embodiment of this application.

FIG. 3 is a flowchart illustrating an image model file uploading method in another image model file transmission method according to an embodiment of this application. A server includes an execution area (a collective term for a management area and a processing area) and a database. After receiving an image model file of a first online streamer, a first client packs the image model file and uploads the image model file to the server. The server stores the image model file by using the database, and determines a storage link. The storage link is a storage address of the image model file in the database. The database sends the storage link to the first client, and then the first client stores the storage link, and sends the storage link to the execution area. The execution area stores the storage link, and determines a unique image identifier, in other words, determines the unique image identifier based on the storage link. Further, the execution area obtains a processing configuration, and then pushes the unique image identifier to an asynchronous processing queue, and the asynchronous processing queue compresses the unique image identifier based on the processing configuration. When the processing is completed, image information is obtained. The image information includes the unique image identifier. Then the execution area returns the image information to the first client. Then an image model file encryption method shown in FIG. 4 may be performed.

Figure 4:
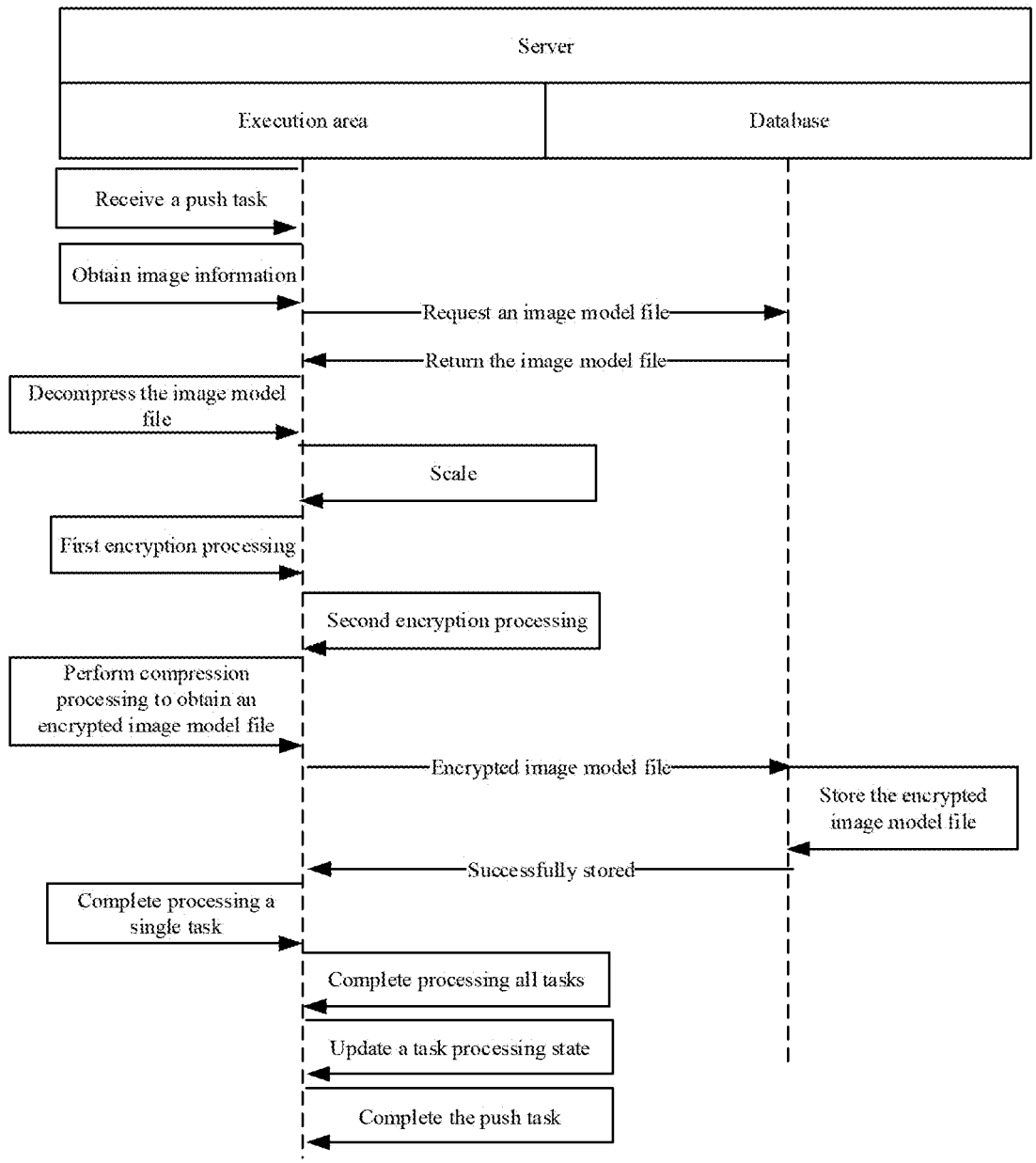
FIG. 4 is a flowchart illustrating an image model file encryption method in an image model file transmission method according to an embodiment of this application.

FIG. 4 is a flowchart illustrating an image model file encryption method in an image model file transmission method according to an embodiment of this application. An execution area receives a push task, and then obtains image information, to determine whether an image model file corresponding to the image information is encrypted. If the image model file is encrypted, the execution area exits the procedure; or if the image model file is not encrypted, the execution area requests the image model file from a database based on the image information. If the request fails, the execution area requests the image model file again; or if the request succeeds, the database returns the image model file. Then the execution area decompresses the image model file by using a decompression algorithm, and invokes an FFmpeg command to scale picture data in the image model file based on a preset scaling specification table. Then the execution area generates an obfuscation key, and performs first encryption processing on the picture data in the image model file by using a preset obfuscated encryption algorithm, to obtain an intermediate image model file and record an obfuscation key. The execution area obtains a symmetric key, and performs second encryption processing, namely, symmetric encryption, on the intermediate image model file. The symmetric key may be a 256-bit key, and each encrypted image model file corresponds to one independent symmetric key. Then the execution area compresses the intermediate image model file obtained after the second encryption processing to obtain an encrypted image model file. Then the execution area sends the encrypted image model file to the database, and the database stores the image encryption file, and returns a message indicating that the storage is completed. The execution area determines that a single task is completed. After all tasks are completed, the execution area updates a processing state, and completes the push task.

Figure 5:
FIG. 5 is a schematic diagram illustrating effects of encrypting picture data in an image model file transmission method according to an embodiment of this application.
Figure 5:
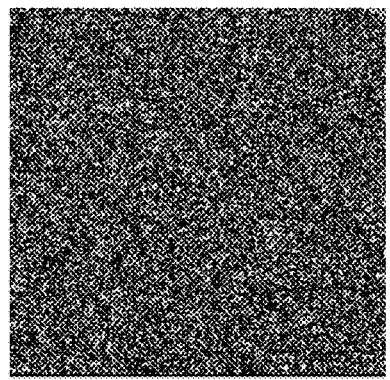
Figure 5:

FIG. 5 is a schematic diagram illustrating effects of encrypting picture data in an image model file transmission method according to an embodiment of this application. Picture data existing before encryption is picture data in an image model file. Encrypted picture data is obtained after first encryption processing is performed on the picture data. The encrypted picture data is completely different from the picture data existing before the encryption.

Step 106: If an interaction request for the first online streamer and a second online streamer is received, send the encrypted image model file to a second client based on an online streamer identifier of the second online streamer that is carried in the interaction request.

In addition to encrypting the image picture based on the target obfuscation key and picture information in the image picture to obtain the encrypted image picture, further, if the interaction request for the first online streamer and the second online streamer is received, the encrypted image model file is sent to the second client based on the online streamer identifier of the second online streamer that is carried in the interaction request.

Specifically, the interaction request is a request generated based on a requirement of interaction between the two online streamers, and may be a co-hosting request, or may be a player killing (PK) request, for example, a co-hosting request initiated by the first online streamer to the second online streamer or a PK request initiated by the second online streamer to the first online streamer. The second online streamer is an online streamer interacting with the first online streamer. It should be noted that only one or more online streamers may simultaneously interact with the first online streamer. When a plurality of online streamers simultaneously interact with the first online streamer, the second online streamer is any one of the online streamers simultaneously interacting with the first online streamer. For example, if the first online streamer is an online streamer A1, and the online streamer A1, an online streamer A2, an online streamer A3, and an online streamer A4 simultaneously interact with each other, the second online streamer may be any one of the online streamer A2, the online streamer A3, and the online streamer A4. The online streamer identifier may be a name of the online streamer, or may be an identity document (ID), namely, a sequence number or an account number, of the online streamer. This is not limited in this application. The second client is a client associated with the second online streamer, namely, a client corresponding to the second online streamer.

In actual applications, after the server receives a request sent by the first online streamer for interacting with the second online streamer or a request sent by the second online streamer for interacting with the first online streamer, in other words, the server receives the interaction request for the first online streamer and the second online streamer, the server determines the second client corresponding to the second online streamer based on the online streamer identifier of the second online streamer in the interaction request, and sends the encrypted image model file to the second client.

For example, if an online streamer A needs to interact with an online streamer B, the online streamer A or the online streamer B sends an interaction request for the online streamer A and the online streamer B to the server: When the online streamer A is used as the first online streamer, the server sends an encrypted image model file a corresponding to the online streamer A to a second client corresponding to the online streamer B, namely, a client used by the online streamer B, based on an online streamer identifier of the online streamer B in the interaction request. When the online streamer B is used as the first online streamer, the server sends an encrypted image model file b corresponding to the online streamer B to a second client corresponding to the online streamer A, namely, a client used by the online streamer A, based on an online streamer identifier of the online streamer A in the interaction request.

In one or more embodiments of this specification, after receiving the interaction request for the first online streamer and the second online streamer, the server may send a download link of the encrypted image model file to the second client based on the online streamer identifier of the second online streamer that is carried in the interaction request. Then the second client downloads the corresponding encrypted image model file from a database of the server based on the download link.

Step 108: Send the target key to the second client when a decryption request sent by the second client is received, where the target key is used by the second client to decrypt the encrypted image model file to obtain the image model file.

In addition to sending the encrypted image model file to the second client based on the online streamer identifier of the second online streamer in the interaction request, the server sends the target key to the second client when receiving the decryption request.

In actual applications, after receiving the encrypted image picture, the second client needs to request the target obfuscation key from the server. In this case, the second client generates the decryption request based on the encrypted image model file, and then sends the decryption request to the server, and the server receives the decryption request sent by the second client. Further, the second client sends the target key corresponding to the encrypted image model file to the second client based on an identifier of the encrypted image model file that is carried in the decryption request. Then the second client decrypts the encrypted image model file based on the target key to obtain the image model file of the first online streamer, and further renders an image of the first online streamer on the second client based on the image model file of the first online streamer.

Continuing with the foregoing example, when the online streamer A is used as the first online streamer, after receiving the encrypted image model file a, the second client corresponding to the online streamer B generates a decryption request a1 based on the encrypted image model file a, and then sends the decryption request a1 to the server. The server sends a target key a2 corresponding to the encrypted image model file a to the second client based on the decryption request a1, and then the second client decrypts the encrypted image model file a based on the target key a2 to obtain an image model file a3 of the online streamer A. When the online streamer B is used as the first online streamer, after receiving the encrypted image model file b, the second client corresponding to the online streamer A generates a decryption request b1 based on the encrypted image model file b, and then sends the decryption request b1 to the server. The server sends a target key b2 corresponding to the encrypted image model file b to the second client based on the decryption request b1, and then the second client decrypts the encrypted image model file b based on the target key b2 to obtain an image model file b3 of the online streamer B.

FIG. 5 is a schematic diagram illustrating effects of encrypting picture data in an image model file transmission method according to an embodiment of this application. Picture data existing before encryption is picture data in an image model file. Encrypted picture data is obtained after first encryption processing is performed on the picture data. The encrypted picture data is completely different from the picture data existing before the encryption. Decrypted picture data is obtained after the encrypted picture data is decrypted. The decrypted picture data and the picture data existing before the encryption are the same, and both are raw picture data in the image model file.

To improve the security of the image model file, when receiving the decryption request, the server needs to check the decryption request to determine properness of using the target key by a client sending the decryption request. If the check succeeds, the server returns the target key. That is, a specific implementation process of sending the target key to the second client may be as follows:

checking the decryption request sent by the second client to determine whether the decryption request meets a preset decryption rule; and
if yes, sending the target key to the second client; or
if no, not responding to the decryption request.

Specifically, the preset decryption rule is a rule for determining whether the request of the client for the target key is proper, in other words, is a rule for determining whether the decryption request is proper, for example, determining whether the client sending the decryption request is the second client used by the second online streamer.

In actual applications, after receiving the decryption request, the server needs to perform properness check on the decryption request, in other words, determine whether the decryption request meets the preset decryption rule, to determine whether the target key can be returned based on an interaction relationship between the online streamers. If yes, the server sends the target key to the client; or if no, the server does not respond to the decryption request or returns request failure information to the second client. In this way, the server determines whether to feed back the target key by checking the decryption request, instead of directly sending the target key when receiving the decryption request, so that a client other than the second client is prevented from obtaining the target key and stealing the image model file of the first online streamer, thereby improving the security of transmitting the image model file.

For example, a client R1 sends a decryption request r1 to the server, and the server checks the decryption request r1 based on the preset decryption rule. If a check result is that the client R1 is not the second client corresponding to the second online streamer, the server does not respond to the decryption request r1. A client R2 sends a decryption request r2 to the server, and the server checks the decryption request r2 based on the preset decryption rule. If a check result is that the sending client R2 is the second client corresponding to the second online streamer, the server sends the target key to the client R2.

In some embodiments, to avoid leakage of the target key and leakage of the image model file because the target key is intercepted in the process of sending the target key from the server to the second client or the server mistakenly sends the target key to another client, the decryption request sent by the second client carries a second-client public key, so that the server encrypts the target key based on the second-client public key to prevent leakage of the target key. That is, when the decryption request carries the second-client public key, a specific implementation process of sending the target key to the second client may be as follows:

performing third encryption processing on the target key based on the second-client public key to obtain an encrypted target key; and
sending the encrypted target key to the second client.

Specifically, the second-client public key is a key that is provided by the second client and is used to encrypt the target key.

In actual applications, when the decryption request meets the preset decryption rule, the server encrypts, based on the second-client public key in the decryption request, the target key requested by the second client to obtain the encrypted target key, and further sends the encrypted target key to the second client. Then the second client decrypts the encrypted target key by using the second-client public key to obtain the target key.

For example, the second-client public key is "123123", the target key is "123456", and the server encrypts the target key to obtain the encrypted target key "****". Then the server sends "**" to the second client. The second client decrypts "**" by using the second-client public key "123123" to obtain the target key "123456".

In some embodiments, to avoid leakage of the target key and leakage of the image model file because the target key is intercepted in the process of sending the target key from the server to the second client or the server mistakenly sends the target key to another client, when the decryption request carries a second-client public key, a specific implementation process of sending the target key to the second client may be as follows:

generating a server private key and a server public key, where the server private key and the server public key are one key pair;

generating a first key based on the second-client public key and the server private key, and performing third encryption processing on the target key based on the first key to obtain an encrypted target key, and sending the encrypted target key and the server public key to the second client, where the server public key is used by the second client to generate a second key with reference to a second-client private key and decrypt the encrypted target key based on the second key, and the second-client private key and the second-client public key are one key pair.

In actual applications, the second client generates a pair of public and private keys, namely, the second-client private key and the second-client public key. The second client generates the decryption request carrying the second-client public key, and sends the decryption request to the server. After receiving the decryption request, the server also generates a pair of public and private keys, namely, the server private key and the server public key, calculates the first key based on the server private key and the second-client public key, and then encrypts the target key based on the first key to obtain the encrypted target key. The server returns the encrypted target key and the server public key to the second client, and the second client calculates the second key based on the server public key and the second-client private key. The second key is the same as the first key. Further, the second client decrypts the encrypted target key based on the second key to obtain the target key.

For example, the second-client private key is "112233", the second-client public key is "123123", the server private key is "223344", the server public key is "234234", and the target key is "123456". The second client sends the decryption request carrying "123123" to the server, and then the server generates the first key "346467" based on "123123" and "223344", and encrypts the target key based on "346467" to obtain the encrypted target key "****", Then the server sends "*" and "234234" to the second client. Then the second client generates the second key "346467" based on "234234" and "112233", and the second client decrypts "******" by using "346467" to obtain the target key "123456".

In addition, to ensure the security of transmitting the image picture or to subsequently trace a leakage path, before sending the target key to the second client, the server further needs to record file usage information of the second client. That is, before the target key is sent to the second client, the method further includes:

when the decryption request meets the preset decryption rule, extracting and recording the file usage information of the second client that is carried in the decryption request, where the file usage information includes at least one of a user identifier, a usage scenario, a usage scope, a file usage identifier, and a usage time corresponding to the second client.

Specifically, the user identifier is a user identifier of a user corresponding to the second client, namely, the second online streamer. The usage scenario refers to resolution of a display of a computer device corresponding to the second client, for example, resolution of a screen of a mobile phone or resolution of a display of a computer. The usage scope refers to a purpose of the second client in using the target key and the encrypted image model file, for example, displaying the image of the first online streamer on the second client. The file usage identifier refers to identifiers corresponding to the target key and the image model file used by the second client. The usage time is a time at which the second client uses the target key and the encrypted image model file, and may be represented by a time at which the second client sends the decryption request.

In actual applications, when the decryption request meets the preset decryption rule, the server needs to send the target key to the second client. To implement traceability of use of the target obfuscation key and trace a leakage path and to provide clues and data support for accountability once the target obfuscation key is unfortunately leaked, before sending the target key, the server needs to extract the file usage information of the second client in the decryption request and record the file usage information. The file usage information includes at least one of the user identifier, the usage scenario, the usage scope, the file usage identifier, and the usage time corresponding to the second client.

For example, if a decryption request sent by a client M meets the preset decryption rule, file usage information of the client M is extracted from the decryption request and recorded. The file usage information includes user m1 (user identifier), resolution 512*512 (usage scenario), livestreaming watching (usage scenario), target key m2, encrypted image model file m3 (file usage identifier), and 16:30 pm on Nov. 18, 2021 (usage time).

When the first online streamer and the second online streamer interact with each other, the second client further needs to render a dynamic image of the first online streamer on the second client based on the image model file, to generate an interactive video stream of interaction between the first online streamer and the second online streamer, and send the interactive video stream to the server. Then the server sends the video stream to a client used by an audience of the second online streamer. That is, after the target key is sent to the second client, the method further includes:

receiving the interactive video stream sent by the second client, where the interactive video stream is generated by the second client based on the image model file;

determining an audience identifier corresponding to the second online streamer, and sending the interactive video stream to an audience client corresponding to the audience identifier, where the interactive video stream is used by the audience client to display an interactive picture between the first online streamer and the second online streamer.

Specifically, the interactive video stream is a video stream generated through interaction between the first online streamer and the second online streamer, and is used to display interactive content of the first online streamer and the second online streamer. The audience identifier is an identifier corresponding to an audience watching the second online streamer, and the audience client is a client used by the audience of the second online streamer.

In actual applications, after decrypting the encrypted image model file to obtain the image model file, the second client renders the dynamic image of the first online streamer on the second client based on the image model file, generates the interactive video stream of interaction between the first online streamer and the second online streamer with reference to an image of the second online streamer, and then pushes the interactive video stream to the server. After receiving the interactive video stream, the server determines the audience identifier corresponding to the second online streamer, in other words, determines the audience watching the second online streamer, and then sends the interactive video stream to the audience client used by the audience of the second online streamer, so that the audience client displays the interactive picture between the first online streamer and the second online streamer based on the interactive video stream.

An example in which an online streamer 1 and an online streamer 2 perform live PK is used to describe the image model file transmission method.

(1) The online streamer 1 uploads an image model file P of the online streamer 1 to the server by using a client ①, the online streamer 2 uploads an image model file Q of the online streamer 2 to the server by using a client ②, and the server separately stores and encrypts the image model file P and the image model file Q to obtain an encrypted image model file p and an encrypted image model file q.

(2) The online streamer 1 initiates a live PK request to the online streamer 2 by using the server, the online streamer 2 receives the live PK request initiated by the online streamer 1 by using the server, and the server stores information about the online streamer 1 and the online streamer 2 and a correspondence, for example, identifiers (ID) and room information of the online streamer 1 and the online streamer 2.

(3) The client ① queries whether the image model file Q of the online streamer 2 exists in a local buffer; and if no, the client ① requests to download the image model file Q and a target key corresponding to the image model file Q from the server; or if yes, the client ① requests a key corresponding to the image model file Q from the server.

In addition, the client ② queries whether the image model file P of the online streamer 1 exists in a local buffer: and if no, the client ② requests to download the image model file P and a target key corresponding to the image model file P from the server; or if yes, the client ② requests a key corresponding to the image model file P from the server.

(4) The server performs, based on the identifiers of the online streamer 1 and the online streamer 2 in the live PK request, authentication on a request of the client ① for obtaining the encrypted image model file q or a target key corresponding to the encrypted image model file q and authentication on a request of the client ② for obtaining the encrypted image model file p or a target key corresponding to the encrypted image model file p. After the authentication succeeds, the server sends the encrypted image model file q and the target key corresponding to the encrypted image model ile q to the client ①, and the server sends the encrypted image model file p and the target key corresponding to the encrypted image model file p to the client ②.

For example, if the live PK request corresponds to the online streamer 1 and the online streamer 2, the server binds a correspondence between the online streamer 1 and the online streamer 2. When receiving the request of the client ① for obtaining the image model file P, the server determines whether a correspondence exists between the online streamer 1 and the online streamer 2. If the correspondence exists, the authentication succeeds.

(5) The client ① decrypts the encrypted image model file q based on the target key to obtain the image model file Q, and the client ② decrypts the encrypted image model file p based on the target key to obtain the image model file P.

(6) In the PK process of the online streamer 1 and the online streamer 2, the client ① renders, based on the image model file Q and the image model file P, a picture of PK performed by the online streamer 1 and the online streamer 2 by using avatars, generates a first interactive video stream, and sends the first interactive video streamer to the server. The client ② renders, based on the image model file P and the image model file Q, a picture of PK performed by the online streamer 1 and the online streamer 2 by using the avatars, generates a second interactive video stream, and sends the second interactive video stream to the server.

(7) The server determines a first audience client corresponding to the online streamer 1, and sends the first interactive video stream to the first audience client, so that the first audience client renders, based on the first interactive video stream, the picture of PK performed by the online streamer 1 and the online streamer 2 by using the avatars. The server determines a second audience client corresponding to the online streamer 2, and sends the second interactive video stream to the second audience client, so that the second audience client renders, based on the second interactive video stream, the picture of PK performed by the online streamer 1 and the online streamer 2.

In the image model file transmission method provided in this application, the image model file of the first online streamer that is sent by the first client is first received. Then the target key is obtained, and the image model file is encrypted based on the target key to obtain the encrypted image model file. If the interaction request for the first online streamer and the second online streamer is received, the encrypted image model file is sent to the second client based on the online streamer identifier of the second online streamer that is carried in the interaction request. The target key is sent to the second client when the decryption request sent by the second client is received. The target key is used by the second client to decrypt the encrypted image model file to obtain the image model file. The image model file is encrypted, so that all image model files stored in a memory are encrypted files, which ensures that the image model file of the online streamer in the memory cannot be obtained and is securely used in the second client, thereby effectively reducing a risk of leakage of the image model file of the online streamer and improving the security of transmitting the image model file. The server completes encrypting the image model file before receiving the interaction request instead of encrypting the image model file after receiving the interaction request, so that the server can send the image model file to the second client immediately after receiving the interaction request. In this way, response efficiency of the second client can be improved, and a timely response effect of livestreaming can be achieved. In addition, the image model file of the first online streamer is encrypted once being received instead of being encrypted after the interaction request is received, so that sufficient time can be provided for the encryption process, and encryption can be performed by using an encryption algorithm with a relatively high degree of encryption, to increase the difficulty in decoding the image model file, thereby further reducing a risk of leakage of the image model file of the online streamer and improving the security of transmitting the image model file. The encrypted image model file and the target key are separately sent, and the server sends the target key only when the second client sends the decryption request, so that the target key is dynamically managed, and the difficulty in decoding the image model file is further increased. In addition, it is easy to use the method provided in this application, and transformation costs of clients are reduced.

Figure 6:
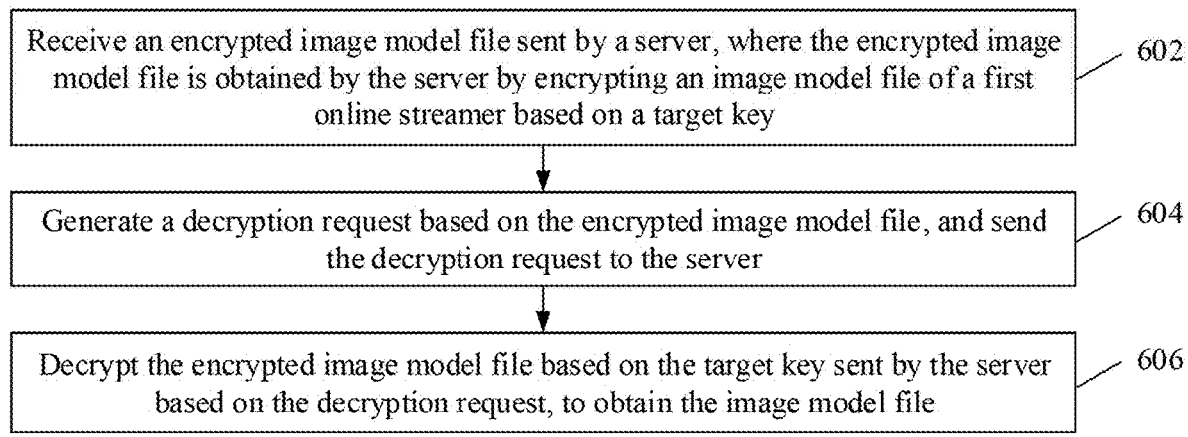
FIG. 6 is a flowchart illustrating another image model file transmission method according to an embodiment of this application.

FIG. 6 is a flowchart illustrating another image model file transmission method according to an embodiment of this application. The method is applied to a second client and specifically includes the following steps.

Step 602: Receive an encrypted image model file sent by a server, where the encrypted image model file is obtained by the server by encrypting an image model file of a first online streamer based on a target key.

Specifically, the first online streamer is any online streamer. In some embodiments, the first online streamer is any online streamer who performs livestreaming by using an avatar or an image of an unreal person. A second online streamer is an online streamer interacting with the first online streamer. It should be noted that only one or more online streamers may simultaneously interact with the first online streamer. When a plurality of online streamers simultaneously interact with the first online streamer, the second online streamer is any one of the online streamers simultaneously interacting with the first online streamer. A first client is a client used by the first online streamer. The second client is a client associated with the second online streamer, namely, a second client corresponding to the second online streamer. The image model file refers to resources such as a picture and a model used to form an avatar of the first online streamer. A key is a parameter, and specifically, is a parameter input to an algorithm of converting a plaintext into a ciphertext or converting a ciphertext into a plaintext. The encrypted image model file is an image model file obtained after the encryption. Encryption is a process of changing original information data by using a special algorithm.

In actual applications, after receiving the image model file of the first online streamer that is sent by the first client, the server obtains the target key, and encrypts the image model file based on the target key to obtain the encrypted image model file. After receiving an interaction request for the first online streamer and the second online streamer, the server determines, based on an online streamer identifier of the second online streamer in the interaction request, the second client corresponding to the second online streamer and an audience client corresponding to an audience watching the second online streamer, in other words, determines the second client, and sends the encrypted image model file to the second client. In other words, the second client receives the encrypted image model file sent by the server.

It should be noted that to avoid repeatedly receiving the encrypted image model file, the second client further needs to query whether the encrypted image model file corresponding to the first online streamer is locally stored before receiving the encrypted image model file sent by the server. If no, the second client requests the encrypted image model file from the server, and the server sends the encrypted image model file. That is, before the encrypted image model file sent by the server is received, the method further includes:

querying whether the encrypted image model file is locally stored; and if no, generating an encrypted image model file obtaining request, and sending the encrypted image model file obtaining request to the server.

In actual applications, when interaction is enabled between the first online streamer and the second online streamer, the client used by the second online streamer, namely, the second client, locally queries whether the encrypted image model file is stored, for example, queries whether the encrypted image model file exists in a local buffer or a memory. If no, the second client generates the encrypted image model file obtaining request for the first online streamer, and then sends the encrypted image model file obtaining request to the server, so that the server sends the encrypted image model file corresponding to the first online streamer to the second client based on the encrypted image model file obtaining request, and the second client receives the encrypted image model file sent by the server.

In addition, if it is found that the encrypted image model file is locally stored, the second client does not need to obtain the encrypted image model file from the server. In this case, the second client may generate a decryption request based on the encrypted image model file, and send the decryption request to the server. In other words, if yes, the second client generates the decryption request based on the encrypted image model file, and sends the decryption request to the server.

For example, the first online streamer invites the second online streamer to perform co-hosting of livestreaming, and after the second online streamer receives the invitation, the second client used by the second online streamer queries whether the encrypted image model file corresponding to the first online streamer is locally stored. If yes, the second client generates the decryption request, and sends the decryption request to the server to request the target key from the server; or if no, the second client generates the encrypted image model file obtaining request for the first online streamer, and sends the encrypted image model file obtaining request to the server to request the encrypted image model file from the server.

Step 604: Generate the decryption request based on the encrypted image model file, and send the decryption request to the server.

In addition to receiving the encrypted image model file sent by the server, the second client generates the decryption request based on the encrypted image model file, and sends the decryption request to the server.

In actual applications, after receiving the encrypted image model file, the second client extracts an identifier, for example, a name or an identification number, of the encrypted image model file, generates the decryption request carrying the identifier of the encrypted image model file, and then sends the decryption request to the server to request the target key corresponding to the encrypted image model file from the server.

Step 606: Decrypt the encrypted image model file based on the target key sent by the server based on the decryption request, to obtain the image model file.

In addition to generating the decryption request based on the encrypted image model file and sending the decryption request to the server, the second client decrypts the encrypted image model file based on the target key fed back by the server.

In actual applications, after receiving the decryption request, the server obtains the target key corresponding to the encrypted image model file based on the identifier of the encrypted image model file that is carried in the decryption request, and then sends the target key to the second client. Then the second client decrypts the encrypted image model file by using the target key to obtain the image model ile of the first online streamer.

It should be noted that, after obtaining the image model file of the first online streamer, the second client needs to render an image of the first online streamer on the second client based on the image model file, generate an interactive video stream, and send the interactive video stream to the server. That is, after the encrypted image model file is decrypted based on the target key sent by the server based on the decryption request, to obtain the image model file, the method further includes:

rendering the image of the first online streamer based on the image model file; and generating the interactive video stream of the first online streamer and the second online streamer based on the image of the first online streamer and an image of the second online streamer, where the interactive video stream is used to display an interactive picture between the first online streamer and the second online streamer.

Specifically, the interactive video stream is a video stream generated through interaction between the first online streamer and the second online streamer, and is used to display interactive content of the first online streamer and the second online streamer.

In actual applications, after decrypting the encrypted image model file to obtain the image model file, the second client renders a dynamic image of the first online streamer on the second client based on the image model file, and generates the interactive video stream of interaction between the first online streamer and the second online streamer with reference to the image of the second online streamer. In other words, the second client displays the interactive picture between the first online streamer and the second online streamer. In this way, the interaction can be more appreciated, and the online streamers can be more interested in the interaction, so that user viscosity is improved. In addition, after generating the interactive video stream, the second client further needs to send the interactive video stream to the server. That is, after the interactive video stream of the first online streamer and the second online streamer is generated based on the image of the first online streamer and the image of the second online streamer, the method further includes:

sending the interactive video stream to the server, where the interactive video stream is forwarded by the server to the audience client corresponding to the second online streamer.

In actual applications, after generating the interactive video stream of the first online streamer and the second online streamer, the second client further needs to push the interactive video stream to the server. After receiving the interactive video stream, the server determines the audience identifier corresponding to the second online streamer, in other words, determines the audience watching the second online streamer, and then sends the interactive video stream to the audience client used by the audience of the second online streamer, so that the audience client displays the interactive picture between the first online streamer and the second online streamer based on the interactive video stream.

Figure 7:
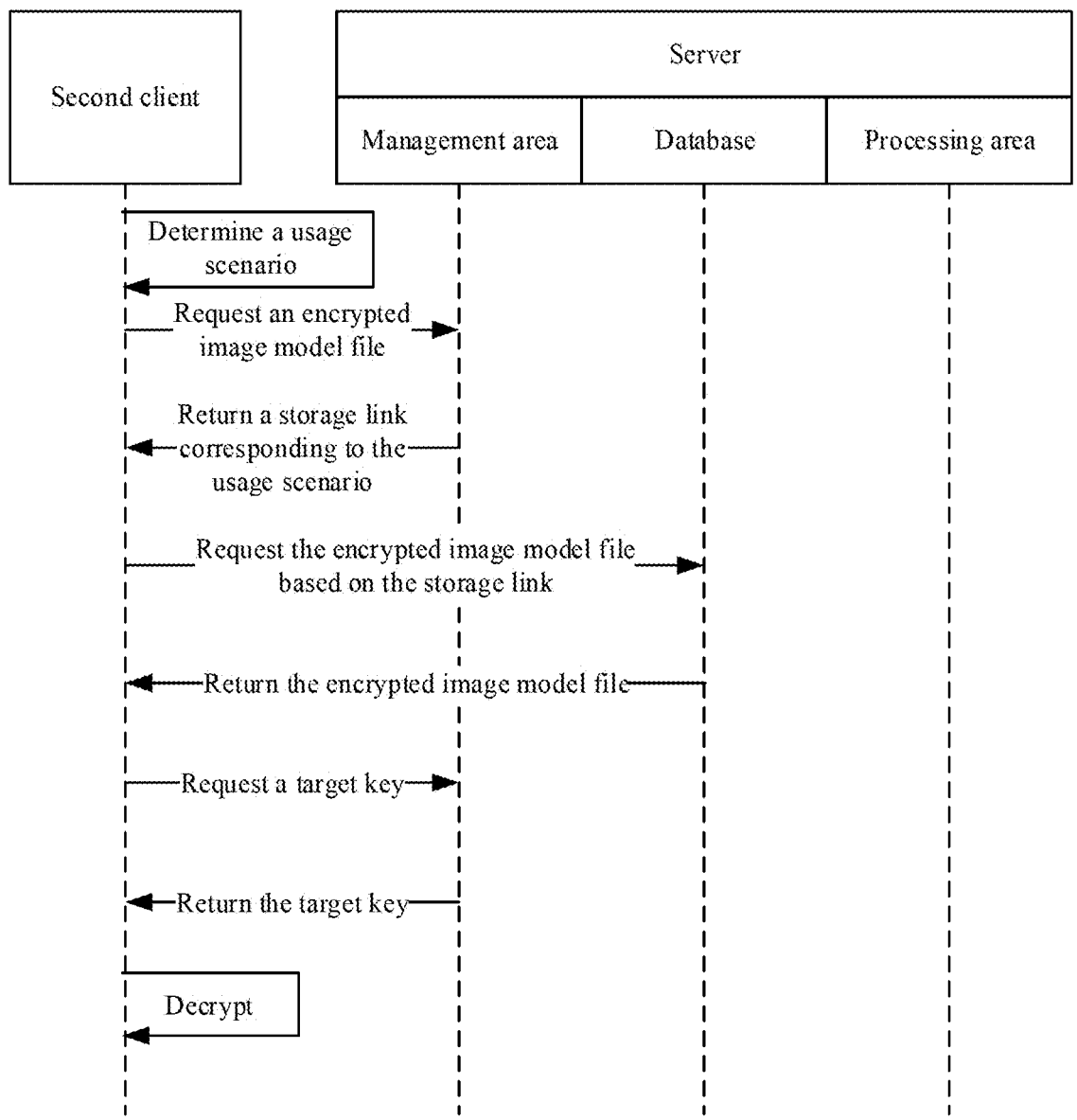
FIG. 7 is a flowchart illustrating an image model file downloading method in an image model file transmission method according to an embodiment of this application.

FIG. 7 is a flowchart illustrating an image model file downloading method in an image model file transmission method according to an embodiment of this application. A server includes a management area, a database, and a processing area. A second client determines a usage scenario, that is, determines resolution of a display of a computer device corresponding to the second client, and then requests an encrypted image model file from the management area based on the usage scenario. Then the management area returns a storage link corresponding to the usage scenario based on the usage scenario, in other words, returns a storage link of an encrypted image model file corresponding to the usage scenario. In addition, the second client requests the encrypted image model file based on the storage link, in other words, requests the encrypted image model file from the database, and then the database returns the encrypted image model file corresponding to the storage link to the second client. The second client further requests a target key from the management area based on the encrypted image model file. After the management area returns the target key, the second client decrypts the encrypted image model file based on the target key to obtain an image model file.

Figure 8:
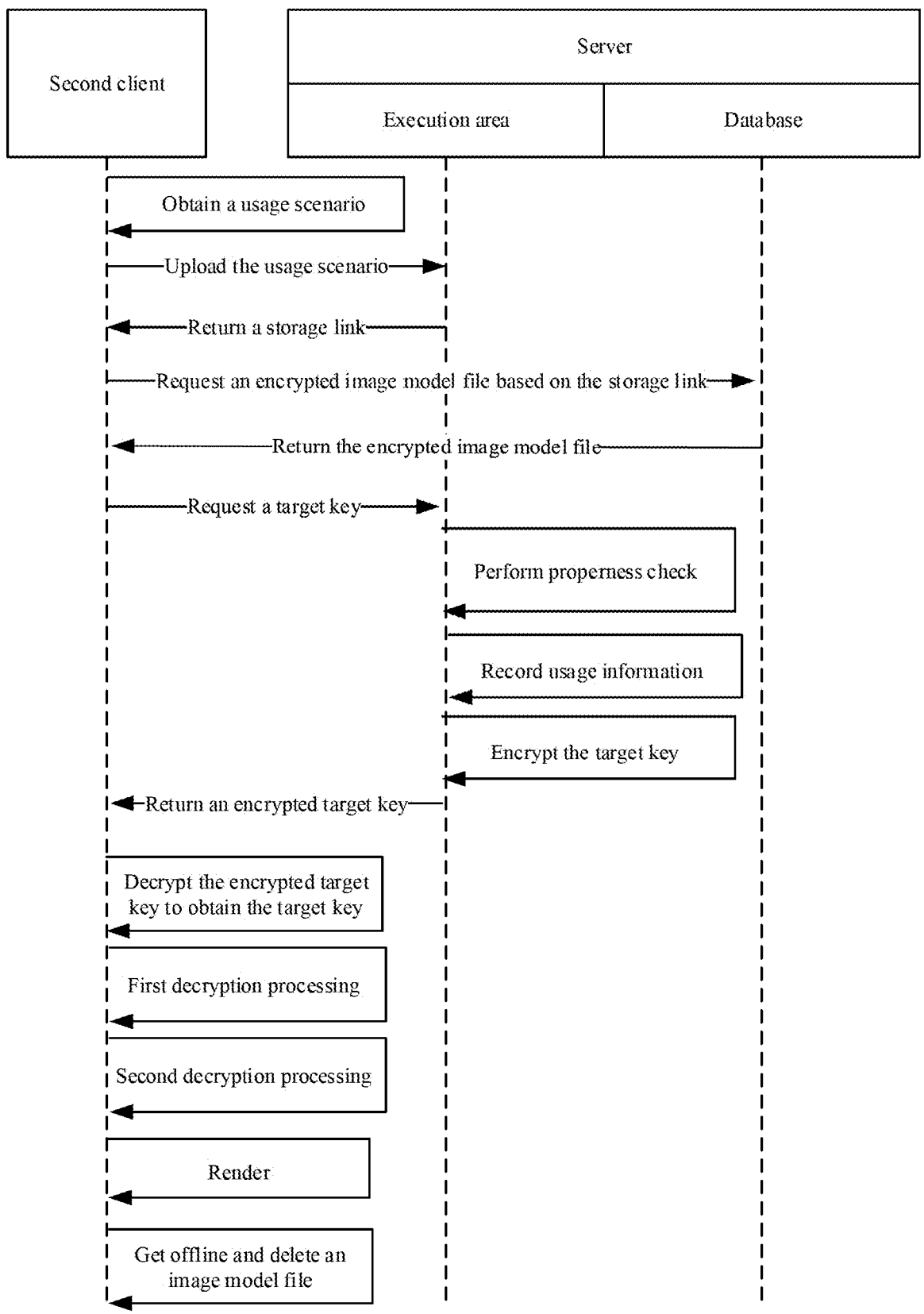
FIG. 8 is a flowchart illustrating an image model file downloading method in another image model file transmission method according to an embodiment of this application.

FIG. 8 is a flowchart illustrating an image model file downloading method in another image model file transmission method according to an embodiment of this application. A server includes an execution area (a collective term for a management area and a processing area) and a database. A second client obtains a usage scenario, that is, determines resolution of a display of a computer device corresponding to the second client, and then uploads the usage scenario to the execution area, in other words, requests an encrypted image model file from the execution area based on the usage scenario. The execution area returns a storage link based on the usage scenario, in other words, returns a storage link of an encrypted image model file corresponding to the usage scenario. In addition, the second client requests the encrypted image model file based on the storage link, in other words, requests the encrypted image model file from the database, and then the database returns the encrypted image model file corresponding to the storage link to the second client, and simply, returns the encrypted image model file. Further, the second client requests a target key from the execution area based on the encrypted image model file, and the execution area determines the target key of the encrypted image model file. That is, the second client generates a second-client public key, adds the second-client public key to a decryption request, and sends the decryption request to the execution area. The execution area performs properness check on the decryption request, in other words, determines whether the decryption request meets a preset decryption rule or determines whether to return corresponding key information based on an interaction relationship between a user and a model owner. If yes, the execution area records usage information, encrypts the target key based on the second-client public key, and then returns an encrypted target key. After receiving the encrypted target key, the second client performs decryption based on a server public key to obtain the target key, in other words, decrypts the encrypted target key with reference to the server public key to obtain the target key. Then the second client performs first decryption processing and second decryption processing on the encrypted image model file based on the target key to obtain an image model file. Then the second client performs rendering based on the image model file. After the interaction ends, the second client flushes a file cache (the image model file) in a memory in a timely manner, in other words, an online streamer is offline, the image model file is deleted, and this procedure is performed again when needed next time.

In the image model file transmission method provided in this application, the encrypted image model file sent by the server is received. The encrypted image model file is obtained by the server by encrypting the image model file of the first online streamer based on the target key. The decryption request is generated based on the encrypted image model file, and the decryption request is sent to the server. The encrypted image model file is decrypted based on the target key sent by the server based on the decryption request, to obtain the image model file. The image model file is encrypted, so that all image model files stored in a memory are encrypted files, which ensures that the image model file of the online streamer in the memory cannot be obtained and is securely used in the second client, thereby effectively reducing a risk of leakage of the image model file of the online streamer and improving the security of transmitting the image model file. The server completes encrypting the image model file before receiving the interaction request instead of encrypting the image model file after receiving the interaction request, so that the server can send the image model file to the second client immediately after receiving the interaction request. In this way, response efficiency of the second client can be improved, and a timely response effect of livestreaming can be achieved. In addition, the image model file of the first online streamer is encrypted once being received instead of being encrypted after the interaction request is received, so that sufficient time can be provided for the encryption process, and encryption can be performed by using an encryption algorithm with a relatively high degree of encryption, to increase the difficulty in decoding the image model file, thereby further reducing a risk of leakage of the image model file of the online streamer and improving the security of transmitting the image model file. The encrypted image model file and the target key are separately sent, and the server sends the target key only when the second client sends the decryption request, so that the target key is dynamically managed, and the difficulty in decoding the image model file is further increased. In addition, it is easy to use the method provided in this application, and transformation costs of clients are reduced.

The foregoing describes a schematic solution of an image model file transmission method applied to a second client in the embodiments. It should be noted that the technical solution of the image model file transmission method applied to a second client and the technical solution of the foregoing image model file transmission method applied to a server belong to the same concept. For details not described in detail in the technical solution of the image model file transmission method applied to a second client, references can be made to the descriptions of the technical solution of the foregoing image model file transmission method applied to a server.

Figure 9:
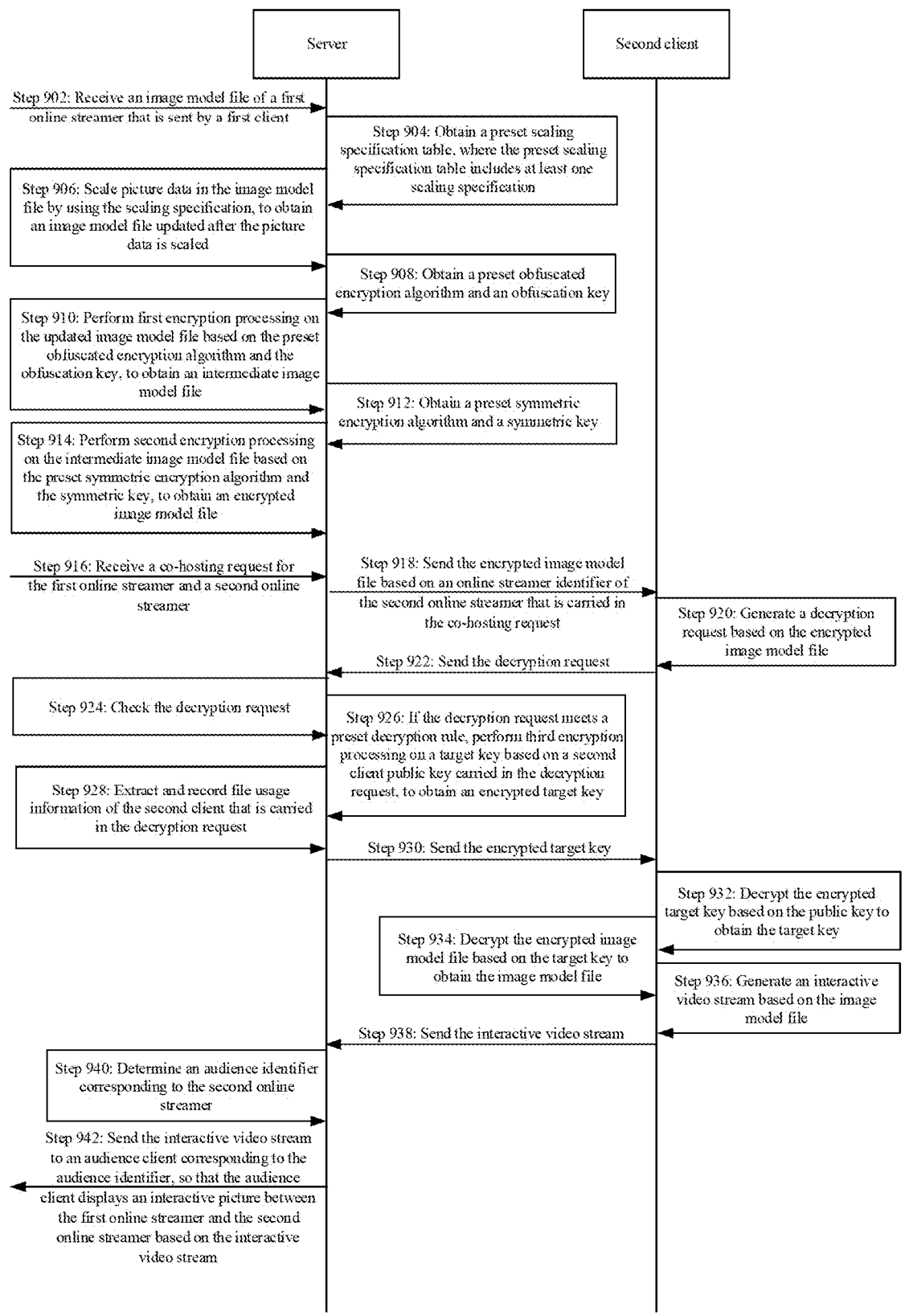
FIG. 9 is a processing flowchart illustrating an image model file transmission method applied to co-hosting between online streamers according to an embodiment of this application.

Taking the application of the image model file transmission method provided in this application to co-hosting between online streamers as an example, the following further describes the image model file transmission method with reference to FIG. 9. FIG. 9 is a processing flowchart illustrating an image model file transmission method applied to co-hosting between online streamers according to an embodiment of this application. The method specifically includes the following steps.

Step 902: A server receives an image model file of a first online streamer that is sent by a first client.

Step 904: The server obtains a preset scaling specification table, where the preset scaling specification table includes at least one scaling specification.

Step 906: The server scales picture data in the image model file by using the scaling specification, to obtain an image model file updated after the picture data is scaled.

Step 908: The server obtains a preset obfuscated encryption algorithm and an obfuscation key.

Step 910: The server performs first encryption processing on the updated image model file based on the preset obfuscated encryption algorithm and the obfuscation key, to obtain an intermediate image model file.

Step 912: The server obtains a preset symmetric encryption algorithm and a symmetric key.

Step 914: The server performs second encryption processing on the intermediate image model file based on the preset symmetric encryption algorithm and the symmetric key, to obtain an encrypted image model file.

Step 916: The server receives a co-hosting request for the first online streamer and a second online streamer.

Step 918: The server sends the encrypted image model file to a second client based on an online streamer identifier of the second online streamer that is carried in the co-hosting request.

Step 920: The second client generates a decryption request based on the encrypted image model file.

Step 922: The second client sends the decryption request to the server.

Step 924: The server checks the decryption request.

Step 926: If the decryption request meets a preset decryption rule, the server performs third encryption processing on a target key based on a second-client public key carried in the decryption request, to obtain an encrypted target key.

Step 928: The server extracts and records file usage information of the second client that is carried in the decryption request.

The file usage information includes at least one of a user identifier, a usage scenario, a usage scope, a file usage identifier, and a usage time corresponding to the second client.

Step 930: The server sends the encrypted target key to the second client.

Step 932: The second client decrypts the encrypted target key based on the public key to obtain the target key.

Step 934: The second client decrypts the encrypted image model file based on the target key to obtain the image model file.

Step 936: The second client generates an interactive video stream based on the image model file.

Step 938: The second client sends the interactive video stream to the server.

Step 940: The server determines an audience identifier corresponding to the second online streamer.

Step 942: The server sends the interactive video stream to an audience client corresponding to the audience identifier, so that the audience client displays an interactive picture between the first online streamer and the second online streamer based on the interactive video stream.

In the image model file transmission method provided in this application, the image model file is encrypted, so that all image model files stored in a memory are encrypted files, which ensures that the image model file of the online streamer in the memory cannot be obtained and is securely used in the second client, thereby effectively reducing a risk of leakage of the image model file of the online streamer and improving the security of transmitting the image model file. The server completes encrypting the image model file before receiving an interaction request instead of encrypting the image model file after receiving the interaction request, so that the server can send the image model file to the second client immediately after receiving the interaction request. In this way, response efficiency of the second client can be improved, and a timely response effect of livestreaming can be achieved. In addition, the image model file of the first online streamer is encrypted once being received instead of being encrypted after the interaction request is received, so that sufficient time can be provided for the encryption process, and encryption can be performed by using an encryption algorithm with a relatively high degree of encryption, to increase the difficulty in decoding the image model file, thereby further reducing a risk of leakage of the image model file of the online streamer and improving the security of transmitting the image model file. The encrypted image model file and the target key are separately sent, and the server sends the target key only when the second client sends the decryption request, so that the target key is dynamically managed, and the difficulty in decoding the image model file is further increased. In addition, it is easy to use the method provided in this application, and transformation costs of clients are reduced.

On the basis of an image model file transmission method provided in this application, an online-streamer image picture in an image model file may be further transmitted. That is, an embodiment of this application provides a method for transmitting an online-streamer image picture in live interaction. The method is applied to a server and specifically includes the following steps.

Step A2: Receive an online-streamer image picture sent by a first client, and obtain a target obfuscation key.

Specifically, an online streamer is a person who participates in a series of operations such as planning, editing, recording, production, and audience interaction and serves as a host in an Internet program or activity. A first online streamer is any online streamer. In some embodiments, the first online streamer is any online streamer who performs livestreaming by using an avatar or an image of an unreal person. The first client is a client used by the first online streamer, and may be any intelligent device such as a mobile phone, a tablet computer, or an intelligent computer. The online-streamer image picture refers to picture resources used to form an avatar of the online streamer, namely, model texture mapping resources of the avatar or picture data in an image model file. Obfuscation is an encryption operation that makes a relationship between a key and a ciphertext (the online-streamer image picture) as ambiguous as possible. The target obfuscation key is a key corresponding to obfuscation, and may be a string such as one or a combination of numbers, letters, and symbols, or may be in the form of a matrix or an array.

In actual applications, after an online streamer selects, on an upload interface for an online-streamer image picture by using a client used by the online streamer, an online-streamer image picture that needs to be uploaded by the online streamer and is used to construct an avatar of the online streamer, and clicks "OK" or any key confirming that the online-streamer image picture is to be uploaded, the client sends the online-streamer image picture to the server, that is, the first client sends the online-streamer image picture to the server, and the server receives the online-streamer image picture sent by the first client. Further, to ensure the security when the server sends the online-streamer image picture to another client, the server needs to encrypt the online-streamer image picture. Therefore, the server may first obtain a key, namely, the target obfuscation key, for encrypting the online-streamer image picture.

For example, a game streamer selects, from a local database by using an upload interface of a livestreaming platform, an online-streamer image picture XX corresponding to an avatar to be displayed by the game streamer, and then adds the online-streamer image picture XX to the upload interface and clicks a key confirming that the online-streamer image picture XX is to be uploaded, and the livestreaming platform uploads the online-streamer image picture XX to the server. Further, the server obtains the target obfuscation key to encrypt the online-streamer image picture XX.

It should be noted that the first online streamer may alternatively send, to the server by using the first client, an online-streamer image model file that needs to be uploaded by the first online streamer and is used to construct an image of the online streamer. The image model file includes the online-streamer image picture and an online-streamer image model, and the online-streamer image model may be two-dimensional or three-dimensional. This is not limited in this application. The server may first receive the online-streamer image model file sent by the first client, and then may obtain the online-streamer image picture from the online-streamer image model file, obtain the target obfuscation key, and record a correspondence between the target obfuscation key and the online-streamer image picture. In other words, the target obfuscation key uniquely corresponds to the online-streamer image picture.

To improve the security of the target obfuscation key, the server may first obtain an initial obfuscation key, and then convert the initial obfuscation key to obtain the target obfuscation key. That is, a specific implementation process of obtaining the target obfuscation key may be as follows:

obtaining the initial obfuscation key; and performing preset bitwise operation processing on the initial obfuscation key to obtain the target obfuscation key.

Specifically, the initial obfuscation key is an unprocessed obfuscation key directly obtained by the server. Bitwise operation processing is a process of directly performing an operation, for example, bitwise AND, bitwise OR, leftward shifting, or rightward shifting, on values of binary bits. The preset bitwise operation processing is performing preset bitwise operation processing on corresponding binary bits corresponding to the initial obfuscation key.

In actual applications, the server may first randomly generate an initial obfuscation key. Because the randomly generated initial obfuscation key can be obtained from a memory of the server, and data is stored in a computer (server or client) in a binary form, to ensure the security of the obfuscation key and increase the difficulty of decoding, preset bitwise operation processing needs to be performed on the obtained initial obfuscation key to obtain a target obfuscation key.

For example, if the initial obfuscation key randomly generated by the server is 11, a binary form corresponding to 11 is 1011, and preset bitwise operation processing is bitwise NOT processing, 1011 becomes 0100, and a number corresponding to 0100 is 4, in other words, the target obfuscation key is 4.

To further improve the security of the target obfuscation key and improve the security of transmitting the online-streamer image picture, each bit in the initial obfuscation key may be randomized. That is, a specific implementation process of performing preset bitwise operation processing on the initial obfuscation key to obtain the target obfuscation key may be as follows:

for any bit in the initial obfuscation key, randomizing a value of the bit by using a preset randomized algorithm to obtain a new value of the bit: and generating the target obfuscation key based on new values of all bits.

Specifically, when the initial obfuscation key is in a string form, any bit in the initial obfuscation key is any character in the string. When the initial obfuscation key is a matrix or an array, any bit in the initial obfuscation key is any element in the matrix or the array. The randomized algorithm means that a random function is used in the algorithm, and a return of the random function directly or indirectly affects an execution procedure or an execution result of the algorithm. The randomized algorithm is based on a randomized method, and depends on a probability.

In actual applications, after the initial obfuscation key is obtained, a value of each bit may be randomized by using the preset randomized algorithm to obtain a new value corresponding to the value of each bit in the initial obfuscation key.

For example, if the initial obfuscation key is a string "1234567", 1, 2, 3, 4, 5, 6, and 7 may be separately randomized by using the preset randomized algorithm to obtain new values respectively corresponding to 1, 2, 3, 4, 5, 6, and 7, and further, a new value corresponding to 1, a new value corresponding to 2, a new value corresponding to 3, a new value corresponding to 4, a new value corresponding to 5, a new value corresponding to 6, and a new value corresponding to 7 may be combined to obtain the target obfuscation key.

For example, if the initial obfuscation key is an array "12, 8, 22, 50". 12, 8, 22, and 50 may be separately randomized by using the preset randomized algorithm to obtain new values respectively corresponding to 12, 8, 22, and 50, and further, a new value corresponding to 12, a new value corresponding to 8, a new value corresponding to 22, and a new value corresponding to 50 may be combined to obtain the target obfuscation key.

It should be noted that after the initial obfuscation key is obtained, values of the first bit to the last bit in the initial obfuscation key may be sequentially recorded in an index table (key_array_index). Then the first value is extracted from the index table, and the value is randomized by using the preset randomized algorithm to obtain a new value corresponding to the first bit in the initial obfuscation key. For specific randomization, references can be made to Formula (1). The second value is extracted from the index table, and the value is randomized by using the preset randomized algorithm to obtain a new value corresponding to the second bit in the initial obfuscation key. The process is repeated until a new value corresponding to the last bit in the initial obfuscation key is obtained.

$$F_{(k)} = \text{Function}(f_{(k)}) \quad \text{(Formula 1)}$$

In Formula (1), k is a positive integer, $F_{(k)}$ represents a new value corresponding to the kth bit in the initial obfuscation key, $f_{(k)}$ represents a value corresponding to the kth bit in the initial obfuscation key, and Function represents randomization.

In some embodiments, randomization may be specific to a bitwise operation.

Step A4: Encrypt the online-streamer image picture based on the target obfuscation key and picture information in the online-streamer image picture to obtain an encrypted online-streamer image picture.

In addition to receiving the online-streamer image picture and obtaining the target obfuscation key, the online-streamer image picture is encrypted based on the target obfuscation key and the picture information in the online-streamer image picture to obtain the encrypted online-streamer image picture.

Specifically, the picture information, also referred to as picture data, is a data set representing a picture, for example, a color value of a pixel, a quantity of pixels, and a size of the picture. Encryption is a process of changing original information data by using a special algorithm, and may be an exclusive OR encryption algorithm, a shift encryption algorithm, an AND algorithm, an OR algorithm, or the like.

In actual applications, the server may first read the picture information in the online-streamer image picture, and then encrypt the online-streamer image picture with reference to the target obfuscation key, in other words, encrypt the picture information in the online-streamer image picture based on the target obfuscation key, to obtain the encrypted online-streamer image picture corresponding to the online-streamer image picture.

In some embodiments, the picture information includes a color value of each pixel in the online-streamer image picture. The color value of each pixel in the online-streamer image picture may be encrypted, so that the online-streamer image picture is encrypted. That is, a specific implementation process of encrypting the online-streamer image picture based on the target obfuscation key and the picture information in the online-streamer image picture to obtain the encrypted online-streamer image picture may be as follows:

encrypting the color value of each pixel based on the target obfuscation key to obtain an encrypted color value of each pixel; and generating the encrypted online-streamer image picture based on all encrypted color values.

Specifically, the pixel is the most basic unit element included in the online-streamer image picture, and each pixel has a specific location and an allocated color value. The color value may be a value corresponding to a color when a pixel is displayed, for example, an ARGB value or an RGB value.

In actual applications, the color value of each pixel in the online-streamer image picture may be obtained, and then the color value of each pixel may be encrypted based on the target obfuscation key. After color values of all the pixels are encrypted, the encrypted online-streamer image picture is obtained based on encrypted color values of all the pixels. In this way, the color value of each pixel in the online-streamer image picture is encrypted, so that a difference between the encrypted online-streamer image picture and the online-streamer image picture is further increased, thereby improving the security of transmitting the online-streamer image picture.

For example, the target obfuscation key is "1, 2, 3, 4", the online-streamer image picture includes four pixels, a color value of the first pixel is 6, a color value of the second pixel is 3, a color value of the third pixel is 11, and a color value of the fourth pixel is 7. If encryption is encryption of an AND operation, an AND operation is performed on the color value 6 (0110) of the first pixel and the first bit 1 (0001) in the target obfuscation key to obtain an encrypted color value 0 (0000), an AND operation is performed on the color value 3 (0011) of the second pixel and the second bit 2 (0010) in the target obfuscation key to obtain an encrypted color value 1 (0010), an AND operation is performed on the color value 1 (1011) of the third pixel and the third bit 3 (0011) in the target obfuscation key to obtain an encrypted color value 3 (0011), and an AND operation is performed on the color value 7 (0111) of the fourth pixel and the fourth bit 4 (0100) in the target obfuscation key to obtain an encrypted color value 4 (0100). Then the encrypted online-streamer image picture is generated based on the encrypted color value 0, the encrypted color value 1, the encrypted color value 3, and the encrypted color value 4, in other words, color values of four pixels of the encrypted online-streamer image picture are 0, 1, 3, and 4.

A Cartesian coordinate system is established by using a vertex at the lower left corner of the online-streamer image picture as the origin, a horizontal direction oriented to the right as the x-axis, and a vertical direction oriented upwards as the y-axis. $P_{xy}$ represents each pixel of the online-streamer image picture. All the pixels of the online-streamer image picture may be obtained based on different values of x and y.

In some embodiments, the color value may include transparency and a chrominance value. Therefore, when the color value is encrypted, the transparency and the chrominance value may be separately encrypted. That is, when the color value includes the transparency and the chrominance value, a specific implementation process of encrypting the color value of each pixel based on the target obfuscation key to obtain the encrypted color value of each pixel may be as follows:

starting from the ith pixel in the online-streamer image picture,
performing an exclusive OR operation on transparency of the ith pixel in the online-streamer image picture and a value of the (2i−1)th bit in the target obfuscation key to obtain encrypted transparency of the ith pixel, where i=1;
performing an exclusive OR operation on a chrominance value of the ith pixel in the online-streamer image picture and a value of the (2i)th bit in the target obfuscation key to obtain an encrypted chrominance value of the ith pixel;
obtaining an encrypted color value of the ith pixel based on the encrypted transparency and the encrypted chrominance value of the ith pixel;
determining whether the ith pixel in the online-streamer image picture is the last pixel; and
if no, increasing i by 1, and re-performing the step of performing an exclusive OR operation on transparency of the ith pixel in the online-streamer image picture and a value of the (2i−1)th bit in the target obfuscation key.

Specifically, the transparency is used to indicate how transparent a pixel is, and the greater the transparency, the more transparent the pixel is. The chrominance value is a value corresponding to a color when a pixel is displayed, for example, an RGB value.

In actual applications, the first pixel in the online-streamer image picture may be first selected, and then transparency and a chrominance value of the first pixel may be determined. Then an exclusive OR operation is performed on a value of the first bit in the target obfuscation key and the transparency of the first pixel to obtain encrypted transparency of the first pixel, an exclusive OR operation is performed on a value of the second bit in the target obfuscation key and the chrominance value of the first pixel to obtain an encrypted chrominance value of the first pixel, and an encrypted color value of the first pixel is obtained based on the encrypted transparency and the encrypted chrominance value of the first pixel. Further, the second pixel in the online-streamer image picture is selected, and transparency and a chrominance value of the second pixel are determined. Then an exclusive OR operation is performed on a value of the third bit in the target obfuscation key and the transparency of the second pixel to obtain encrypted transparency of the second pixel, an exclusive OR operation is performed on a value of the fourth bit in the target obfuscation key and the chrominance value of the second pixel to obtain an encrypted chrominance value of the second pixel, and an encrypted color value of the second pixel is obtained based on the encrypted transparency and the encrypted chrominance value of the second pixel. The process is repeated until an encrypted color value of the last pixel in the online-streamer image picture is determined. In this way, the online-streamer image picture can be encrypted at a finer granularity in the manner of encrypting the transparency and the chrominance value, so that a difference between the encrypted online-streamer image picture and the online-streamer image picture is further increased, thereby improving the security of transmitting the online-streamer image picture.

For example, if the target obfuscation key is "15, 13, 8, 1", the online-streamer image picture includes two pixels, transparency of the first pixel is 11, a chrominance value of the first pixel is 13, transparency of the second pixel is 7, and a chrominance value of the second pixel is 9, an exclusive OR operation is performed on the transparency 11 (1011) of the first pixel and the value 15 (1111) of the first bit in the target obfuscation key to obtain encrypted transparency 4 (0100) of the first pixel, an exclusive OR operation is performed on the chrominance value 13 (1101) of the first pixel and the value 13 (1101) of the second bit in the target obfuscation key to obtain an encrypted chrominance value 0 (0000) of the first pixel, and then an encrypted color value of the first pixel is obtained based on the encrypted transparency 4 and the encrypted chrominance value 0 of the first pixel. Then an exclusive OR operation is performed on the transparency 7 (0111) of the second pixel and the value 8 (1000) of the third bit in the target obfuscation key to obtain encrypted transparency 15 (1111) of the second pixel; an exclusive OR operation is performed on the chrominance value 9 (1001) of the second pixel and the value 1 (0001) of the fourth bit in the target obfuscation key to obtain an encrypted chrominance value 14 (1110) of the second pixel, and then an encrypted color value of the second pixel is obtained based on the encrypted transparency 15 and the encrypted chrominance value 14 of the second pixel.

In some embodiments, the color value may include transparency, a first chrominance value, a second chrominance value, and a third chrominance value. Therefore, when the color value is encrypted, the transparency, the first chrominance value, the second chrominance value, and the third chrominance value may be separately encrypted. That is, when the color value includes the transparency, the first chrominance value, the second chrominance value, and the third chrominance value, a specific implementation process of encrypting the color value of each pixel based on the target obfuscation key to obtain the encrypted color value of each pixel may be as follows:

starting from the jth pixel in the online-streamer image picture, performing an exclusive OR operation on transparency of the jth pixel in the online-streamer image picture and a value of the (4j−3)th bit in the target obfuscation key to obtain encrypted transparency of the jth pixel, where j=1;

performing an exclusive OR operation on a first chrominance value of the jth pixel in the online-streamer image picture and a value of the (4j−2)th bit in the target obfuscation key to obtain an encrypted first chrominance value of the jth pixel;

performing an exclusive OR operation on a second chrominance value of the jth pixel in the online-streamer image picture and a value of the (4j−1)th bit in the target obfuscation key to obtain an encrypted second chrominance value of the jth pixel;

performing an exclusive OR operation on a third chrominance value of the jth pixel in the online-streamer image picture and a value of the (4j)th bit in the target obfuscation key to obtain an encrypted third chrominance value of the jth pixel;

obtaining an encrypted color value of the jib pixel based on the encrypted transparency, the encrypted first chrominance value, the encrypted second chrominance value, and the encrypted third chrominance value of the jth pixel;

determining whether the jth pixel in the online-streamer image picture is the last pixel; and if no, increasing j by 1, and re-performing the step of performing an exclusive OR operation on transparency of the jth pixel in the online-streamer image picture and a value of the (4j−3)th bit in the target obfuscation key.

Specifically, the transparency is used to indicate how transparent a pixel is, and the greater the transparency, the more transparent the pixel is. The first chrominance value, the second chrominance value, and the third chrominance value are values respectively corresponding to red, green, and blue when a pixel is displayed, in other words, the first chrominance value, the second chrominance value, and the third chrominance value are respectively an R value, a G value, and a B value.

In actual applications, the first pixel in the online-streamer image picture may be first selected, and then transparency, a first chrominance value, a second chrominance value, and a third chrominance value of the first pixel may be determined. Then an exclusive OR operation is performed on a value of the first bit in the target obfuscation key and the transparency of the first pixel to obtain encrypted transparency of the first pixel, an exclusive OR operation is performed on a value of the second bit in the target obfuscation key and the first chrominance value of the first pixel to obtain an encrypted first chrominance value of the first pixel, an exclusive OR operation is performed on a value of the third bit in the target obfuscation key and the second chrominance value of the first pixel to obtain an encrypted second chrominance value of the first pixel, an exclusive OR operation is performed on a value of the fourth bit in the target obfuscation key and the third chrominance value of the first pixel to obtain an encrypted third chrominance value of the first pixel, and an encrypted color value of the first pixel is obtained based on the encrypted transparency, the encrypted first chrominance value, the encrypted second chrominance value, and the encrypted third chrominance value of the first pixel. Further, the second pixel in the online-streamer image picture is selected, and transparency, a first chrominance value, a second chrominance value, and a third chrominance value of the second pixel are determined. Then an exclusive OR operation is performed on a value of the fifth bit in the target obfuscation key and the transparency of the second pixel to obtain encrypted transparency of the second pixel, an exclusive OR operation is performed on a value of the sixth bit in the target obfuscation key and the first chrominance value of the second pixel to obtain an encrypted first chrominance value of the second pixel, an exclusive OR operation is performed on a value of the seventh bit in the target obfuscation key and the second chrominance value of the second pixel to obtain an encrypted second chrominance value of the second pixel, an exclusive OR operation is performed on a value of the eighth bit in the target obfuscation key and the third chrominance value of the second pixel to obtain an encrypted third chrominance value of the second pixel, and an encrypted color value of the second pixel is obtained based on the encrypted transparency, the encrypted first chrominance value, the encrypted second chrominance value, and the encrypted third chrominance value of the second pixel. The process is repeated until an encrypted color value of the last pixel in the online-streamer image picture is determined. Details are shown in Formula (2). In this way, the online-streamer image picture can be encrypted at a finer granularity in the manner of encrypting the transparency, the first chrominance value, the second chrominance value, and the third chrominance value, so that a difference between the encrypted online-streamer image picture and the online-streamer image picture is further increased, thereby improving the security of transmitting the online-streamer image picture.

$$P_j(A)=Q_j(A)\char`\^ F_{(4j-3)}$$

$$P_j(R)=Q_j(R)\char`\^ F_{(4j-2)}$$

$$P_j(G)=Q_j(G)\char`\^ F_{(4j-1)}$$

$$P_j(B)=Q_j(B)\char`\^ F_{(4j)}$$

$$P_j(ARGB)=(P_j(A),P_j(R),P_j(G),P_j(B)) \quad \text{(Formula 2)}$$

In Formula (2), j is any positive integer, $P_j(A)$ is the encrypted transparency of the jth pixel, $Q_j(A)$ is the transparency of the jth pixel, $F_{(4j-3)}$ is the value of the (4j−3)th bit in the target obfuscation key, $P_j(R)$ is the encrypted first chrominance value of the jth pixel, $Q_j(R)$ is the first chrominance value of the jth pixel, $F_{(4j-2)}$ is the value of the (4j−2)th bit in the target obfuscation key, $P_j(G)$ is the encrypted second chrominance value of the jth pixel, $Q_j(G)$ is the second chrominance value of the jth pixel, $F_{(4j-1)}$ is the value of the (4j−1)th bit in the target obfuscation key, $P_j(B)$ is the encrypted third chrominance value of the jth pixel, $Q_j(B)$ is the third chrominance value of the jth pixel, $F_{(4j)}$ is the value of the (4j)th bit in the target obfuscation key, and $P_j(ARGB)$ is the encrypted color value of the jth pixel.

For example, if the target obfuscation key is "15, 13, 8, 1, 1, 2, 3, 4", the online-streamer image picture includes two pixels, transparency of the first pixel is 11, a first chrominance value of the first pixel is 13, a second chrominance value of the first pixel is 7, a third chrominance value of the first pixel is 9, transparency of the second pixel is 7, a first chrominance value of the second pixel is 9, a second chrominance value of the second pixel is 5, and a third chrominance value of the second pixel is 6, an exclusive OR operation is performed on the transparency 11 (1011) of the first pixel and the value 15 (1111) of the first bit in the target obfuscation key to obtain encrypted transparency 4 (0100) of the first pixel, an exclusive OR operation is performed on the first chrominance value 13 (1101) of the first pixel and the value 13 (1101) of the second bit in the target obfuscation key to obtain an encrypted first chrominance value 0 (0000) of the first pixel, an exclusive OR operation is performed on the second chrominance value 7 (0111) of the first pixel and the value 8 (1000) of the third bit in the target obfuscation key to obtain an encrypted second chrominance value 15 (1111) of the first pixel, an exclusive OR operation is performed on the third chrominance value 9 (1001) of the first pixel and the value 1 (0001) of the fourth bit in the target obfuscation key to obtain an encrypted third chrominance value 14 (1110) of the first pixel, and further, an encrypted color value of the first pixel is obtained based on the encrypted transparency 4, the encrypted first chrominance value 0, the encrypted second chrominance value 15, and the encrypted third chrominance value 14 of the first pixel. Then an exclusive OR operation is performed on the transparency 7 (0111) of the second pixel and the value 1 (0001) of the fifth bit in the target obfuscation key to obtain encrypted transparency 14 (1110) of the second pixel, an exclusive OR operation is performed on the first chrominance value 9 (1001) of the second pixel and the value 2 (0010) of the sixth bit in the target obfuscation key to obtain an encrypted first chrominance value 10 (1010) of the second pixel, an exclusive OR operation is performed on the second chrominance value 5 (0101) of the second pixel and the value 3 (0011) of the seventh bit in the target obfuscation key to obtain an encrypted second chrominance value 6 (0110) of the second pixel, an exclusive OR operation is performed on the third chrominance value 6 (0110) of the second pixel and the value 4 (0100) of the eighth bit in the target obfuscation key to obtain an encrypted third chrominance value 2 (0010) of the second pixel, and further, an encrypted color value of the second pixel is obtained based on the encrypted transparency 14, the encrypted first chrominance value 10, the encrypted second chrominance value 6, and the encrypted third chrominance value 2 of the second pixel.

It should be noted that because the online-streamer image picture includes a large quantity of pixels, when color values of the pixels are encrypted, the target obfuscation key is extremely complex and large if values of bits in the target obfuscation key need to be in a one-to-one correspondence with transparency and chrominance values of the pixels or values of bits in the target obfuscation key need to be in a one-to-one correspondence with transparency, first chrominance values, second chrominance values, and third chrominance values of the pixels, resulting in an increase of a data processing amount of the server for the target obfuscation key. Therefore, to reduce the data processing amount of the server, values of bits in the target obfuscation keys may be repeatedly used. That is, when a value of the last bit in the target obfuscation key has been used before encryption of all the color values of the pixels is completed, a value of the first bit in the target obfuscation key may be used again.

For example, if the target obfuscation key is "1, 2, 3, 4", the online-streamer image picture includes four pixels, and the color value includes transparency and a chrominance value, an exclusive OR operation is performed on transparency of the first pixel and "1", an exclusive OR operation is performed on a chrominance value of the first pixel and "2", an exclusive OR operation is performed on transparency of the second pixel and "3", an exclusive OR operation is performed on a chrominance value of the second pixel and "4", an exclusive OR operation is performed on transparency of the third pixel and "1", an exclusive OR operation is performed on a chrominance value of the third pixel and "2", an exclusive OR operation is performed on transparency of the fourth pixel and "3", and an exclusive OR operation is performed on a chrominance value of the fourth pixel and "4".

For example, if the target obfuscation key is "1, 2, 3, 4, 5, 6", the online-streamer image picture includes four pixels, and the color value includes transparency, a first chrominance value, a second chrominance value, and a third chrominance value, an exclusive OR operation is separately performed on transparency of the first pixel and "I", a first chrominance value of the first pixel and "2", a second chrominance value of the first pixel and "3", and a third chrominance value of the first pixel and "4", an exclusive OR operation is separately performed on transparency of the second pixel and "5", a first chrominance value of the second pixel and "6", a second chrominance value of the second pixel and "1", and a third chrominance value of the second pixel and "2", an exclusive OR operation is separately performed on transparency of the third pixel and "5", a first chrominance value of the third pixel and "6", a second chrominance value of the third pixel and "1", and a third chrominance value of the third pixel and "2", and an exclusive OR operation is separately performed on transparency of the fourth pixel and "3", a first chrominance value of the fourth pixel and "4", a second chrominance value of the fourth pixel and "5", and a third chrominance value of the fourth pixel and "6".

Step A6: If a live interaction request for the first client and the second client is received, send the encrypted online-streamer image picture and the target obfuscation key to the second client.

In addition to encrypting the online-streamer image picture based on the target obfuscation key and the picture information in the online-streamer image picture to obtain the encrypted online-streamer image picture, the encrypted online-streamer image picture is sent to the second client when the live interaction request for the first client and the second client is received.

Specifically, the live interaction request is a request generated based on a requirement of interaction between the two online streamers during livestreaming, and may be a co-hosting request, or may be a PK request. It should be noted that only one or more online streamers may simultaneously interact with the first online streamer. When a plurality of online streamers simultaneously interact with the first online streamer, a second online streamer is any one of the online streamers simultaneously interacting with the first online streamer. For example, if the first online streamer is an online streamer A1, and the online streamer A1, an online streamer A2, an online streamer A3, and an online streamer A4 simultaneously interact with each other, the second online streamer may be any one of the online streamer A2, the online streamer A3, and the online streamer A4. The second online streamer is an online streamer interacting with the first online streamer. An online streamer identifier may be a name of an online streamer, or may be an ID, namely, a sequence number or an account number, of an online streamer. This is not limited in this application. The second client is a client associated with the second online streamer, namely, a client corresponding to the second online streamer. The live interaction request for the first client and the second client is an interaction request for the first online streamer and the second online streamer.

In actual applications, after the server receives a request sent by the first online streamer for performing live interaction with the second online streamer or a request sent by the second online streamer for performing live interaction with the first online streamer, in other words, the server receives the live interaction request for the first client and the second client, the server sends the encrypted online-streamer image picture of the first online streamer and the target obfuscation key to the second client based on the live interaction request.

In addition, the live interaction request may carry an online streamer identifier of the second online streamer. In this case, the server may determine the second client corresponding to the second online streamer based on the online streamer identifier of the second online streamer in the live interaction request, and send the encrypted online-streamer image picture and the target obfuscation key to the second client. Then the second client decrypts the encrypted online-streamer image picture based on the target obfuscation key to obtain the online-streamer image picture of the first online streamer, and further renders an image of the first online streamer on the second client based on the online-streamer image picture of the first online streamer.

It should be noted that to ensure the security of transmitting the online-streamer image picture, the server separately sends the encrypted online-streamer image picture and the target obfuscation key to the second client. First, when receiving the live interaction request for the first client and the second client, the server sends the encrypted online-streamer image picture to the second client associated with the second online streamer based on the online streamer identifier of the second online streamer in the live interaction request. Then the second client requests the target obfuscation key from the server after receiving the encrypted online-streamer image picture, and only in this case, the server sends the target obfuscation key to the second client. Before sending the target obfuscation key to the second client, the server further needs to record file usage information of the second client. The file usage information includes at least one of a user identifier, a usage scenario, a usage scope, a file usage identifier, and a usage time corresponding to the second client. In this way, traceability of use of the target obfuscation key can be implemented, and a leakage path can be traced, to provide clues and data support for accountability once the target obfuscation key is unfortunately lost.

In addition, after receiving the target obfuscation key, the second client may directly generate a key picture based on the target obfuscation key, and then obtain the online-streamer image picture of the first online streamer based on the key picture and the encrypted online-streamer image picture, or may directly decrypt the encrypted online-streamer image picture based on the target obfuscation key to obtain the online-streamer image picture of the first online streamer.

It should be noted that after obtaining the online-streamer image picture of the first online streamer, the second client needs to render the image of the first online streamer on the second client based on the online-streamer image picture, generate an interactive video stream of interaction between the first online streamer and the second online streamer with reference to an image of the second online streamer, and then push the interactive video stream to the server. After receiving the interactive video stream, the server determines an audience identifier corresponding to the second online streamer, in other words, determines an audience watching the second online streamer, and then sends the interactive video stream to an audience client used by the audience of the second online streamer, so that the audience client displays an interactive picture between the first online streamer and the second online streamer based on the interactive video stream.

In the method for transmitting an online-streamer image picture in live interaction provided in this application, the online-streamer image picture is encrypted by using the target obfuscation key and the picture information in the online-streamer image picture, so that all online-streamer image pictures stored in a memory are encrypted pictures, which ensures that the online-streamer image picture in the memory cannot be obtained and is securely used in the second-online-streamer client, thereby effectively reducing a risk of leakage of the online-streamer image picture and improving the security of transmitting the online-streamer image picture. The server completes encrypting the online-streamer image picture before receiving the live interaction request instead of encrypting the online-streamer image picture after receiving the live interaction request, so that the server can send the encrypted online-streamer image picture to the second-online-streamer client immediately after receiving the live interaction request. In this way, response efficiency of the second-online-streamer client can be improved, and a timely response effect of livestreaming can be achieved. In addition, the online-streamer image picture of the first online streamer is encrypted once being received instead of being encrypted after the live interaction request is received, so that sufficient time can be provided for the encryption process, and encryption can be performed by using a target obfuscation key with a relatively high degree of encryption, to increase the difficulty in decoding the online-streamer image picture, thereby further reducing a risk of leakage of the online-streamer image picture and improving the security of transmitting the online-streamer image picture. In addition, it is easy to use the method provided in this application, and transformation costs of clients are reduced.

This application further provides another method for transmitting an online-streamer image picture in live interaction. The method is applied to a second client and specifically includes the following steps.

Step B2: Receive an encrypted online-streamer image picture and a target obfuscation key that are sent by a server, where the encrypted online-streamer image picture is obtained by the server by encrypting an online-streamer image picture sent by a first client based on the target obfuscation key and picture information in the online-streamer image picture.

Specifically, a first online streamer is any online streamer. In some embodiments, the first online streamer is any online streamer who performs livestreaming by using an avatar or an image of an unreal person. A second online streamer is an online streamer interacting with the first online streamer. It should be noted that only one or more online streamers may simultaneously interact with the first online streamer. When a plurality of online streamers simultaneously interact with the first online streamer, the second online streamer is any one of the online streamers simultaneously interacting with the first online streamer. The first client is a client used by the first online streamer. The second client is a client associated with the second online streamer, namely, a client corresponding to the second online streamer. The online-streamer image picture refers to picture resources used to form an avatar of the first online streamer, namely, model texture mapping resources of the avatar or picture data in an image model file. The target obfuscation key is a key corresponding to obfuscation, and may be a string such as one or a combination of numbers, letters, and symbols, or may be in the form of a matrix or an array.

In actual applications, after receiving the online-streamer image picture sent by the first client, the server obtains the target obfuscation key, and then encrypts the online-streamer image picture based on the target obfuscation key and the picture information in the online-streamer image picture to obtain the encrypted online-streamer image picture. After receiving a live interaction request for the first client and the second client, the server determines the second client corresponding to the second online streamer based on an online streamer identifier of the second online streamer in the live interaction request, and sends the encrypted online-streamer image picture and the target obfuscation key to the second client. In other words, the second client receives the encrypted online-streamer image picture and the target obfuscation key that are sent by the server.

Step B4: Generate a key picture corresponding to the encrypted online-streamer image picture based on the target obfuscation key.

In addition to receiving the encrypted online-streamer image picture and the target obfuscation key, the key picture is generated based on the target obfuscation key.

Specifically, the key picture is a key picture in which values of bits in the target obfuscation key are respectively used as color values of pixels.

In some embodiments, the values of the bits in the target obfuscation key may be used as the color values of the pixels, and the key picture may be generated based on pixels corresponding to the obtained color values.

For example, if the target key is "1, 2, 3, 4", 1 is used as a color value of the first pixel, 2 is used as a color value of the second pixel, 3 is used as a color value of the third pixel, and 4 is used as a color value of the fourth pixel, and then the key picture corresponding to the encrypted online-streamer image picture is generated based on the four pixels.

In some embodiments, the color value includes transparency and a chrominance value. In this case, values of every two adjacent bits in the target obfuscation key may be respectively used as transparency and a chrominance value of a pixel, and the key picture may be generated based on a pixel corresponding to the obtained transparency and chrominance value.

For example, if the target key is "1, 2, 3, 4", 1 is used as transparency of the first pixel, 2 is used as a chrominance value of the first pixel, 3 is used as transparency of the second pixel, and 4 is used as a chrominance value of the second pixel, and then the key picture corresponding to the encrypted online-streamer image picture is generated based on the two pixels.

In some embodiments, the color value includes transparency, a first chrominance value, a second chrominance value, and a third chrominance value. In this case, values of every four adjacent bits in the target obfuscation key may be respectively used as transparency, a first chrominance value, a second chrominance value, and a third chrominance value of a pixel, and the key picture may be generated based on a pixel corresponding to the obtained transparency, first chrominance value, second chrominance value, and third chrominance value.

For example, if the target key is "1, 2, 3, 4, 5, 6, 7, 8", 1 is used as transparency of the first pixel, 2 is used as a first chrominance value of the first pixel, 3 is used as a second chrominance value of the first pixel, 4 is used as a third chrominance value of the first pixel, S is used as transparency of the second pixel, 6 is used as a first chrominance value of the second pixel, 7 is used as a second chrominance value of the second pixel, and 8 is used as a third chrominance value of the second pixel, and then the key picture corresponding to the encrypted online-streamer image picture is generated based on the two pixels.

Step B6: Decrypt the encrypted online-streamer image picture based on the key picture to obtain the online-streamer image picture.

In addition to generating the key picture based on the target obfuscation key, the online-streamer image picture is obtained based on the key picture and the encrypted online-streamer image picture.

In actual applications, after generating the key picture, the second client may restore or decrypt the encrypted online-streamer image picture based on the key picture to obtain the online-streamer image picture of the first online streamer.

For example, the second client performs an operation (decryption) on all frames in a graphics processing unit (GPU) of the second client by using the key picture and the encrypted online-streamer image picture, to render a decrypted online-streamer image picture, namely, the online-streamer image picture of the first online streamer.

It should be noted that after obtaining the online-streamer image picture of the first online streamer, the second client needs to render the image of the first online streamer on the second client based on the online-streamer image picture, generate an interactive video stream of interaction between the first online streamer and the second online streamer with reference to an image of the second online streamer, and then push the interactive video stream to the server. After receiving the interactive video stream, the server determines an audience identifier corresponding to the second online streamer, in other words, determines an audience watching the second online streamer, and then sends the interactive video stream to an audience client used by the audience of the second online streamer, so that the audience client displays an interactive picture between the first online streamer and the second online streamer based on the interactive video stream.

In the method for transmitting an online-streamer image picture in live interaction provided in this application, the online-streamer image picture is encrypted by using the target obfuscation key and the picture information in the online-streamer image picture, so that all online-streamer image pictures stored in a memory are encrypted pictures, which ensures that the online-streamer image picture in the memory cannot be obtained and is securely used in the second-online-streamer client, thereby effectively reducing a risk of leakage of the online-streamer image picture and improving the security of transmitting the online-streamer image picture. The server completes encrypting the online-streamer image picture before receiving the live interaction request instead of encrypting the online-streamer image picture after receiving the live interaction request, so that the server can send the encrypted online-streamer image picture to the second-online-streamer client immediately after receiving the live interaction request. In this way, response efficiency of the second-online-streamer client can be improved, and a timely response effect of livestreaming can be achieved. In addition, the online-streamer image picture of the first online streamer is encrypted once being received instead of being encrypted after the live interaction request is received, so that sufficient time can be provided for the encryption process, and encryption can be performed by using a target obfuscation key with a relatively high degree of encryption, to increase the difficulty in decoding the online-streamer image picture, thereby further reducing a risk of leakage of the online-streamer image picture and improving the security of transmitting the online-streamer image picture. In addition, it is easy to use the method provided in this application, and transformation costs of clients are reduced.

On the basis of an image model file transmission method provided in this application, an embodiment of this application provides a method for transmitting an online-streamer image model file. The method is applied to a server and specifically includes the following steps.

Step C2: Receive an online-streamer image model file sent by a first-online-streamer client, and obtain a target obfuscation key and a target encryption type.

Specifically, the first-online-streamer client is a client used by a first online streamer, and may be any intelligent device such as a mobile phone, a tablet computer, or an intelligent computer. An online streamer is a person who participates in a series of operations such as planning, editing, recording, production, and audience interaction and serves as a host in an Internet program or activity. The first-online-streamer client is a first client. The first online streamer is any online streamer. In some embodiments, the first online streamer is any online streamer who performs livestreaming by using an avatar or an image of an unreal person. The online-streamer image model file is a file including attribute information, namely, an image model file, required when an online streamer avatar corresponding to an online streamer is generated. For example, the online-streamer image model file includes location information of an avatar A in a livestreaming scenario and action information of the avatar A. A key is a parameter input to an algorithm of converting a plaintext into a ciphertext or converting a ciphertext into a plaintext. The target obfuscation key is a key for encrypting the online-streamer image model file of the first online streamer. Obfuscation is an encryption operation such as an operation of encrypting the online-streamer image model file by using an exclusive OR operation as an encryption operation.

In actual applications, the first-online-streamer client used by the first online streamer generates the online-streamer image model file, and sends the online-streamer image model file to the server. The online-streamer image model file corresponding to the first-online-streamer client is stored in an online-streamer image model file list, and a to-be-encrypted online-streamer image model file may be determined from the online-streamer image model file list based on an actual service requirement. After the to-be-encrypted online-streamer image model file is determined, a preset encryption algorithm is determined, and the target obfuscation key used to encrypt the online-streamer image model file is determined based on the encryption algorithm.

Specifically, a method for obtaining the target obfuscation key includes:
  determining a target encryption algorithm; and
  generating the target obfuscation key based on the target encryption algorithm.

The target encryption algorithm is an algorithm, for example, AES or DES, for encrypting the online-streamer image model file. The target obfuscation key is a key randomly determined based on the target encryption algorithm.

In actual applications, to improve the security of transmitting the online-streamer image model file, online-streamer image model files may be encrypted by using different encryption algorithms. That is, after the to-be-encrypted online-streamer image model file is determined, the target encryption algorithm may be determined based on algorithm information preconfigured by the system, or an encryption algorithm is randomly determined, as the target encryption algorithm for encrypting the online-streamer image model file, for the to-be-encrypted online-streamer image model file based on a preset algorithm selection rule.

In a specific implementation of this application, in the example in which the target encryption algorithm is determined based on the algorithm information preconfigured by the system, a to-be-encrypted online-streamer image model file A is determined based on a service requirement, algorithm information, namely, the AES-GCM algorithm or a GCM encryption model in the AES algorithm, preconfigured by the system, is obtained, and the AES-GCM algorithm is used as a target encryption algorithm for encrypting the online-streamer image model file A.

In another specific implementation of this application, in the example in which the encryption algorithm is randomly determined for the to-be-encrypted online-streamer image model file based on the preset algorithm selection rule, a to-be-encrypted online-streamer image model file B is determined based on a service requirement, and the preset algorithm selection rule is obtained. The preset algorithm selection rule includes an encryption algorithm list including encryption algorithms capable of encrypting online-streamer image model files, and the encryption algorithm list includes the AES algorithm, the DES algorithm, and the like. The DES algorithm is randomly selected from the encryption algorithm list based on the preset algorithm selection rule, and the DES algorithm is used as an encryption algorithm for encrypting the online-streamer image model file.

The encryption algorithm for the to-be-encrypted online-streamer image model file is randomly determined, so that corresponding obfuscation keys are determined based on different encryption algorithms, and subsequently, online-streamer image model files are encrypted based on different encryption algorithms, thereby improving the security of transmitting the online-streamer image model file.

After the target encryption algorithm is determined, the target obfuscation key may be randomly generated based on the target encryption algorithm. For example, if the AES encryption algorithm is determined, a key with a corresponding quantity of bits is randomly generated as the target obfuscation key based on the AES algorithm. A key length that can be supported by the AES encryption algorithm is 128 bits.

After the encryption algorithm for encrypting the online-streamer image model file and the corresponding target obfuscation key are determined, a file encryption policy, namely, the target encryption type, for encrypting the online-streamer image model file further needs to be determined.

Specifically, a method for obtaining the target encryption type includes:
  obtaining a preset selection rule; and
  determining the target encryption type based on the preset selection rule.

The preset selection rule is a rule of selecting the file encryption policy of the to-be-encrypted online-streamer image model file. The target encryption type is a target file encryption policy used when the online-streamer image model file is encrypted. For example, an online-streamer image model ile A is encrypted by using a full encryption policy, in other words, all bytes included in the online-streamer image model file A are encrypted.

In actual applications, to further improve the security of transmitting the online-streamer image model file, online-streamer image model files may be encrypted by using different file encryption types in addition to different encryption algorithms. That is, ater the to-be-encrypted online-streamer image model file is determined, the target encryption type may be determined based on encryption type information preconfigured by the system, or an encryption type is randomly selected, as the target encryption type for encrypting the online-streamer image model file, for the to-be-encrypted online-streamer image model file based on the preset selection rule.

In a specific implementation of this application, in the example in which the target encryption algorithm is randomly selected for the to-be-encrypted online-streamer image model file based on the preset selection rule, a to-be-encrypted online-streamer image model file B is determined, and the preset selection rule is obtained. The preset selection rule includes a file encryption type list. A full encryption type is randomly selected from the file encryption type list, and the full encryption type is used as a target encryption type for encrypting the online-streamer image model file H.

It should be noted that in addition to receiving the online-streamer image model file that includes attribute information and is sent by the first-online-streamer client, a resource file including a model picture may be received. The resource rile including the model picture may be encrypted by using a corresponding picture encryption method and transmitted, so that the online streamer avatar file is protected in many ways, thereby reducing a risk in transmitting the online-streamer image model file.

In this application, different encryption algorithms, different obfuscation keys, and different encryption types are determined for different online-streamer image model files, so that the different online-streamer image model files are subsequently encrypted based on the different encryption algorithms, the different obfuscation keys, and the different encryption types, thereby subsequently minimizing the loss of leakage of the online-streamer image model file.

Step C4: Determine a to-be-encrypted byte in the online-streamer image model file based on the target encryption type, and encrypt the to-be-encrypted byte based on the target obfuscation key to obtain an encrypted online-streamer image file.

Specifically, after the target obfuscation key and the target encryption type for encrypting the to-be-encrypted online-streamer image model file are determined, the online-streamer image model file may be encrypted based on the target obfuscation key and the target encryption type to obtain the encrypted online-streamer image file.

In actual applications, to meet an actual service requirement and improve encryption efficiency, before the online-streamer image model file is encrypted based on the target obfuscation key and the target encryption type, the method further includes:

receiving an online-streamer image model file encryption request, where the online-streamer image model file encryption request includes service requirement information; and in response to the online-streamer image model file encryption request, traversing a model file list corresponding to the first-online-streamer client, and determining an online-streamer image model file that meets the service requirement information in the model file list.

The online-streamer image model file encryption request is a request for encrypting the to-be-encrypted online-streamer image model file. The model file list is a list including at least one online-streamer image model file corresponding to the first online streamer.

Specifically, each online streamer client has a corresponding model file list, and each model file list includes a plurality of online-streamer image model files. To improve the transmission efficiency of the online-streamer image model file, a to-be-encrypted online-streamer image model file may be determined for encryption based on service requirement information in an encryption request.

In a specific implementation of this application, taking an online-streamer image model file A as an example, after receiving the online-streamer image model file encryption request, in response to the encryption request, the server traverses the model file list corresponding to the online streamer client, and determines the online-streamer image model file A carrying location information in the model file list as the to-be-encrypted online-streamer image model file based on location requirement information carried in the encryption request.

The to-be-encrypted online-streamer image model file is determined from the model file list based on the service requirement information in the encryption request, in other words, only the determined to-be-encrypted online-streamer image model file is subsequently encrypted, so that encryption efficiency of the online-streamer image model file is improved.

After the to-be-encrypted online-streamer image model file and the target obfuscation key and the target encryption type of the to-be-encrypted online-streamer image model file are determined, the online-streamer image model file is encrypted based on the target obfuscation key and the target encryption type.

In actual applications, a method for encrypting the online-streamer image model rile based on the target obfuscation key and the target encryption type to obtain the encrypted online-streamer image file may include the following steps.

C4-1-2: If the target encryption type is a prefix encryption type, determine ciphertext length information based on the file attribute information of the online-streamer image model file.

The prefix encryption type is an encryption policy for encrypting some bytes in the online-streamer image model file. The file attribute information is a size of the online-streamer image model file. For example, attribute information of an online-streamer image model file A is a file size 3k. The ciphertext length information is a length of bytes that need to be encrypted in the online-streamer image model file.

Specifically, in an example in which the size of the online-streamer image model file is 10 bytes, when 2 raised to the power of N is greater than 10, a value of N is used as the ciphertext length information. For example, the ciphertext length information is 4 bytes.

C4-1-4: Determine a to-be-encrypted byte and a plaintext byte in the online-streamer image model file based on the ciphertext length information.

The to-be-encrypted byte is a byte that needs to be encrypted in the online-streamer image model file. The plaintext byte is a byte that does not need to be encrypted in the online-streamer image model file.

Specifically, continuing with the foregoing example, 4 bytes are determined from the online-streamer image model file as to-be-encrypted bytes for subsequent encryption based on the ciphertext length information of 4 bytes, and the other 6 bytes are plaintext bytes.

C4-1-6: Encrypt the to-be-encrypted byte based on the target obfuscation key to obtain an encrypted ciphertext.

The encrypted ciphertext is an encrypted byte obtained by encrypting the to-be-encrypted byte based on the obfuscation key.

Specifically, continuing with the foregoing example, 4 to-be-encrypted bytes are encrypted based on the target obfuscation key to obtain an encrypted ciphertext of 4 bytes.

C4-1-8: Generate the encrypted online-streamer image file based on the encrypted ciphertext, the plaintext byte, and the ciphertext length information.

The encrypted online-streamer image file is a file obtained by encrypting the online-streamer image model file.

Specifically, continuing with the foregoing example, the ciphertext length information, the encrypted ciphertext, and the plaintext bytes are encapsulated as the encrypted online-streamer image file.

The online-streamer image model file is encrypted by using the prefix encryption type and the target obfuscation key, in other words, the online-streamer image model file is encrypted by using a random encryption algorithm and a random file encryption policy, so that the security of transmitting the online-streamer image model file is improved.

In actual applications, a method for encrypting the online-streamer image model file based on the target obfuscation key and the target encryption type to obtain the encrypted online-streamer image file may include the following steps.

C4-2-2: If the target encryption type is a segmented encryption type, determine at least two byte segments in the online-streamer image model file based on a preset segmentation rule, where each byte segment includes a to-be-encrypted byte and a plaintext byte.

The segmented encryption type is an encryption policy for encrypting the byte segments in the online-streamer image model file. The preset segmentation rule is a rule of segmenting the online-streamer image model file to obtain at least two byte segments, and may be specifically that M bytes are selected for encryption every N bytes and if Q bytes are left during segmentation and Q is less than M, the remaining Q bytes may constitute one byte segment. M and N are positive integers and are not equal to zero. The byte segment is a byte segment including some bytes in the online-streamer image model file. For example, 5 consecutive bytes are determined, the first 3 bytes are to-be-encrypted bytes, the last 2 bytes are plaintext bytes, and the 5 bytes constitute one byte segment.

Specifically, taking an online-streamer image model file B as an example, if it is determined that the content of the preset segmentation rule is selecting 3 bytes every 2 bytes, the online-streamer image model file is segmented based on the preset segmentation rule to obtain a plurality of byte segments. Each byte segment includes 3 to-be-encrypted bytes and 2 plaintext bytes.

C4-2-4: Encrypt the to-be-encrypted byte in each byte segment based on the target obfuscation key to obtain an encrypted ciphertext, and count a quantity of encrypted ciphertexts.

Each byte segment includes the to-be-encrypted byte. The byte segments are sequentially read, and segmentation is performed for to-be-encrypted bytes in the byte segments to obtain encrypted ciphertexts. When each byte segment includes a to-be-encrypted byte, a quantity of ciphertexts is a quantity of byte segments in the online-streamer image model file.

Specifically, continuing with the foregoing example, to-be-encrypted bytes in each byte segment are repeatedly read, the to-be-encrypted bytes in each byte segment are encrypted based on the target obfuscation key to obtain an encrypted ciphertext, and a quantity of encrypted ciphertexts is also counted.

C4-2-6: Generate the encrypted online-streamer image file based on the encrypted ciphertext and the plaintext byte of each byte segment and the quantity of ciphertexts.

Specifically, continuing with the foregoing example, the encrypted online-streamer image file is obtained through encapsulation based on the encrypted ciphertext and the plaintext byte of each byte segment, the quantity of ciphertexts, and a separator, which is specifically performing storage in a manner of storing encrypted ciphertexts by row and consecutively storing plaintext bytes. The separator is a separation length determined based on a length of the encrypted ciphertext.

The online-streamer image model file is encrypted by using the segmented encryption type and the target obfuscation key, in other words, the image model file is encrypted by using a random encryption algorithm and a random file encryption policy, so that the security of transmitting the online-streamer image model file is improved.

In actual applications, a method for encrypting the online-streamer image model file based on the target obfuscation key and the target encryption type to obtain the encrypted online-streamer image file may include the following steps.

C4-3-2: If the target encryption type is a full encryption type, use each byte in the online-streamer image model file as a to-be-encrypted byte, and encrypt the to-be-encrypted byte based on the target obfuscation key to obtain an encrypted ciphertext.

The full encryption type is an encryption policy for encrypting all bytes in the online-streamer image model file.

Specifically, taking an online-streamer image model file C as an example, a to-be-encrypted byte in the online-streamer image model file C is determined, and the to-be-encrypted byte is encrypted based on the target obfuscation key to obtain an encrypted ciphertext.

C4-3-4: Generate the encrypted online-streamer image file based on the encrypted ciphertext.

Specifically, continuing with the foregoing example, the encrypted ciphertext is encapsulated to obtain the encrypted online-streamer image file.

The online-streamer image model file is encrypted by using the full encryption type and the target obfuscation key, in other words, the online-streamer image model file is encrypted by using a random encryption algorithm and a random file encryption policy, so that the security of transmitting the online-streamer image model file is improved.

In actual applications, a file encryption type other than the foregoing file encryption types may be used to encrypt the online-streamer image model file, provided that the file encryption type can be used to encrypt the to-be-encrypted online-streamer image model file. This is not specifically limited in this application.

After an encryption manner of the to-be-encrypted online-streamer image model file is determined, a mapping relationship between the encryption manner and the encrypted file is established, and is serialized and stored in a database, so that how to decrypt the encrypted online-streamer image file is subsequently determined. Specifically, the encryption manner includes an encryption type, an encryption algorithm, and an obfuscation key.

The online-streamer image model file is encrypted by using the randomly determined obfuscation key and the randomly determined encryption type, so that the security of transmitting the online-streamer image model file is improved.

Step C6: Receive an interaction request for the first-online-streamer client and a second-online-streamer client, and send the encrypted online-streamer image file to the second-online-streamer client based on the interaction request.

Specifically, the interaction request is a request generated based on a requirement of interaction between two online streamers, and may be a co-hosting request, a PK request, or the like. The second-online-streamer client is a client used by a second online streamer, and may be any intelligent device such as a mobile phone, a tablet computer, or an intelligent computer, or may be a client, namely, a second client, corresponding to an audience of the second online streamer. The second online streamer is an online streamer interacting with the first online streamer.

In actual applications, after the server receives a request sent by the first-online-streamer client for interacting with the second-online-streamer client or a request sent by the second-online-streamer client for interacting with the first-online-streamer client, in other words, the server receives the interaction request for the first-online-streamer client and the second-online-streamer client, the server determines, based on an online streamer identifier of the second online streamer in the interaction request, the second-online-streamer client corresponding to the second online streamer and an audience client corresponding to an audience watching the second online streamer, and sends the encrypted online-streamer image file and the target obfuscation key to the second-online-streamer client. Then the second-online-streamer client decrypts the encrypted online-streamer image file based on the target obfuscation key to obtain the online-streamer image model file of the first online streamer, and further renders and displays an avatar of the first online streamer on the second-online-streamer client based on the online-streamer image model file of the first online streamer.

It should be noted that to ensure the security of transmitting the online-streamer image model file, the server separately sends the encrypted online-streamer image file and the target obfuscation key to the second-online-streamer client. First, when receiving the interaction request for the first-online-streamer client and the second-online-streamer client, the server sends the encrypted online-streamer image file to the second-online-streamer client associated with the second online streamer based on the online streamer identifier of the second online streamer in the interaction request. Then the second-online-streamer client requests the target obfuscation key from the server after receiving the encrypted online-streamer image file, and only in this case, the server sends the target obfuscation key to the target client. To improve the security of transmitting the key, a transmission connection used to transmit the key may be established based on a key transmission protocol (for example, the ECDH protocol). Before sending the target obfuscation key to the second-online-streamer client, the server further needs to record file usage information of the second-online-streamer client. The file usage information includes at least one of a user identifier, a usage scenario, a usage scope, a file usage identifier, and a usage time corresponding to the second-online-streamer client, in this way, traceability of use of the target obfuscation key can be implemented, and a leakage path can be traced, to provide clues and data support for accountability once the target obfuscation key is unfortunately lost.

In the method for transmitting an online-streamer image model file in co-hosting of livestreaming, the online-streamer image model file sent by the first-online-streamer client is received, and the target obfuscation key and the target encryption type are obtained. The to-be-encrypted byte in the online-streamer image model file is determined based on the target encryption type, and the to-be-encrypted byte is encrypted based on the target obfuscation key to obtain the encrypted online-streamer image file. The interaction request for the first-online-streamer client and the second-online-streamer client is received, and the encrypted online-streamer image file is sent to the second-online-streamer client based on the interaction request. The online-streamer image model file is encrypted by using the target obfuscation key and the target encryption type, so that it is uneasy to obtain the online-streamer image model file, thereby effectively reducing a risk of leakage of the online-streamer image model file and improving the security of transmitting the online-streamer image model file.

This application further provides another method for transmitting an online-streamer image model file. The method is applied to a second-online-streamer client and specifically includes the following steps.

Step D2: Receive an encrypted online-streamer image file and a target obfuscation key that are sent by a server.

Specifically, the second-online-streamer client is a client used by a second online streamer, and may be any intelligent device such as a mobile phone, a tablet computer, or an intelligent computer, or may be a client corresponding to an audience of an second online streamer, namely, a second client. The encrypted online-streamer image file is a file obtained by encrypting an online-streamer image model file. The target obfuscation key is a key for encrypting the online-streamer image model file, and may be a string such as one or a combination of numbers, letters, and symbols, or may be in the form of a matrix or an array. A first-online-streamer client is a first client, and is a client corresponding to a first online streamer. The second-online-streamer client is the second client, and is a client corresponding to the second online streamer.

In actual applications, after receiving the encrypted online-streamer image model file of the first online streamer that is sent by the first-online-streamer client, the server obtains the target obfuscation key and a target encryption type, and then encrypts the image model file based on the target obfuscation key and the target encryption type to obtain the encrypted online-streamer image file. Then, after the server receives an interaction request for the first-online-streamer client and the second-online-streamer client, the server determines, based on an online streamer identifier of the second online streamer in the interaction request, the second client corresponding to the second online streamer or the client corresponding to the audience of the second online streamer, namely, the second-online-streamer client, and sends the encrypted online-streamer image file and the target obfuscation key to the second-online-streamer client. In other words, the second-online-streamer client receives the encrypted online-streamer image file and the target obfuscation key that are sent by the server.

Step D4: Determine the target encryption type of the encrypted online-streamer image file based on the encrypted online-streamer image file.

Specifically, after receiving the encrypted online-streamer image file, the server parses the encrypted online-streamer image file to determine the encryption type of the encrypted online-streamer image file. For example, if the server parses the encrypted online-streamer image file to determine that the encrypted online-streamer image file does not include a plaintext byte, the server determines that the target encryption type corresponding to the encrypted online-streamer image file is a full encryption type.

Step D6: Decrypt the encrypted online-streamer image file based on the target obfuscation key and the target encryption type to obtain the online-streamer image model file.

In actual applications, a method for decrypting the encrypted online-streamer image file based on the target obfuscation key and the target encryption type to obtain the online-streamer image model file may include:

if the target encryption type is a prefix encryption type, determining ciphertext length information in the encrypted online-streamer image file;

determining an encrypted ciphertext and a plaintext byte in the encrypted online-streamer image file based on the ciphertext length information, and decrypting the encrypted ciphertext based on the target obfuscation key to obtain a to-be-encrypted byte; and obtaining the online-streamer image model file based on the to-be-encrypted byte and the plaintext byte.

For example, it is determined that a target encryption type of an encrypted online-streamer image file A is the prefix encryption type. In this case, ciphertext length information of 10 bytes in the encrypted online-streamer image file A is obtained, an encrypted ciphertext of 10 bytes in the encrypted online-streamer image file A is determined based on the ciphertext length information of 10 bytes, the encrypted ciphertext is decrypted based on the target obfuscation key to obtain a decrypted byte, and the decrypted byte and a plaintext byte is combined to obtain an online-streamer image model file.

In actual applications, a method for decrypting the encrypted online-streamer image file based on the target obfuscation key and the target encryption type to obtain the online-streamer image model file may include:

if the target encryption type is a segmented encryption type, determining a quantity of ciphertexts in the encrypted online-streamer image file;

determining byte segments in the encrypted online-streamer image file based on the quantity of ciphertexts, and decrypting encrypted ciphertexts in the byte segments based on the target obfuscation key to obtain to-be-encrypted bytes and plaintext bytes; and obtaining the online-streamer image model file based on the to-be-encrypted bytes and the plaintext bytes.

For example, it is determined that a target encryption type of an encrypted online-streamer image file B is segmented encryption. In this case, a quantity of ciphertexts in the encrypted online-streamer image file B is obtained, byte segments in the encrypted online-streamer image file B are determined based on the quantity of ciphertexts, and encrypted ciphertexts in the byte segments are decrypted based on the target obfuscation key to obtain decrypted bytes. Separators in the encrypted online-streamer image file B are determined, and the obtained decrypted bytes in the byte segments are inserted into corresponding separator areas, so that the decrypted bytes and plaintext bytes are encapsulated as an online-streamer image model file.

In actual applications, a method for decrypting the encrypted online-streamer image file based on the target obfuscation key and the target encryption type to obtain the online-streamer image model file may include:

if the target encryption type is a full encryption type, decrypting an encrypted ciphertext in the encrypted online-streamer image file based on the target obfuscation key to obtain a to-be-encrypted byte; and obtaining the online-streamer image model file based on the to-be-encrypted byte.

For example, it is determined that a target encryption type of an encrypted online-streamer image file C is full encryption. In this case, an encrypted ciphertext in the encrypted online-streamer image file C is decrypted based on the target obfuscation key to obtain a decrypted byte. The decrypted byte constitutes an online-streamer image model file.

In the method for transmitting an online-streamer image model file that is applied to the second-online-streamer client in this application, the encrypted online-streamer image file and the target obfuscation key that are sent by the server are received, the target encryption type of the encrypted online-streamer image file is determined based on the encrypted online-streamer image rile, and the encrypted online-streamer image file is decrypted based on the target obfuscation key and the target encryption type to obtain the online-streamer image model file. The encrypted online-streamer image file obtained by encrypting the online-streamer image model file is decrypted by using the target obfuscation key and the target encryption type, so that it is uneasy to obtain the online-streamer image model file, thereby effectively reducing a risk of leakage of the online-streamer image model rile and improving the security of transmitting the online-streamer image model file.

Figure 10:
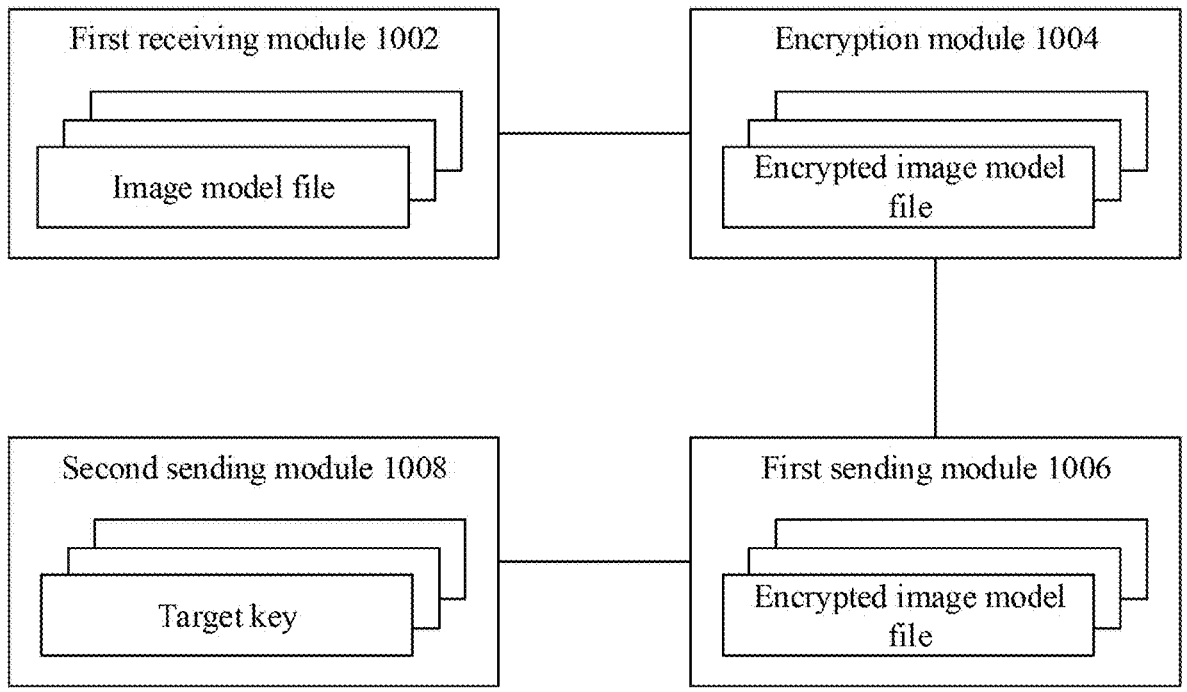
FIG. 10 is a schematic diagram illustrating a structure of an image model file transmission apparatus according to an embodiment of this application.

Corresponding to the method embodiments, this application further provides embodiments of an image model file transmission apparatus. FIG. 10 is a schematic diagram illustrating a structure of an image model file transmission apparatus according to an embodiment of this application. As shown in FIG. 10, the apparatus is applied to a server and includes:

a first receiving module 1002, configured to receive an image model file of a first online streamer that is sent by a first client;

an encryption module 1004, configured to obtain a target key, and encrypt the image model file based on the target key to obtain an encrypted image model file;

a first sending module 1006, configured to: if an interaction request for the first online streamer and a second online streamer is received, send the encrypted image model file to a second client based on an online streamer identifier of the second online streamer that is carried in the interaction request; and a second sending module 1008, configured to send the target key to the second client when a decryption request sent by the second client is received, where the target key is used by the second client to decrypt the encrypted image model file to obtain the image model file.

In some embodiments, the apparatus further includes a scaling module, configured to:

scale picture data in the image model file to obtain an updated image model file; and the encryption module 1004 is further configured to:

encrypt the updated image model file based on the target key to obtain the encrypted image model file.

In some embodiments, the scaling module is configured to:

obtain a preset scaling specification table, where the preset scaling specification table includes at least one scaling specification: and scale the picture data in the image model file by using the scaling specification, to obtain the image model file updated after the picture data is scaled.

In some embodiments, the second sending module 1008 is further configured to:
  check the decryption request sent by the second client to determine whether the decryption request meets a preset decryption rule; and
  if yes, send the target key to the second client.

In some embodiments, the decryption request carries a second-client public key; and
  the second sending module 1008 is further configured to:
  perform third encryption processing on the target key based on the second-client public key to obtain an encrypted target key; and
  send the encrypted target key to the second client.

In some embodiments, the apparatus further includes a recording module, configured to:
  when the decryption request meets the preset decryption rule, extract and record file usage information of the second client that is carried in the decryption request, where the file usage information includes at least one of a user identifier, a usage scenario, a usage scope, a file usage identifier, and a usage time corresponding to the second client.

In some embodiments, the apparatus further includes a processing module, configured to:
  receive an interactive video stream sent by the second client, where the interactive video stream is generated by the second client based on the image model file;
  determine an audience identifier corresponding to the second online streamer; and
  send the interactive video stream to an audience client corresponding to the audience identifier, where the interactive video stream is used by the audience client to display an interactive picture between the first online streamer and the second online streamer.

In the image model file transmission apparatus provided in this application, the image model file of the first online streamer that is sent by the first client is first received. Then the target key is obtained, and the image model file is encrypted based on the target key to obtain the encrypted image model file. If the interaction request for the first online streamer and the second online streamer is received, the encrypted image model file is sent to the second client based on the online streamer identifier of the second online streamer that is carried in the interaction request. The target key is sent to the second client when the decryption request sent by the second client is received. The target key is used by the second client to decrypt the encrypted image model file to obtain the image model file. The image model file is encrypted, so that all image model files stored in a memory are encrypted files, which ensures that the image model file of the online streamer in the memory cannot be obtained and is securely used in the second client, thereby effectively reducing a risk of leakage of the image model file of the online streamer and improving the security of transmitting the image model file. The server completes encrypting the image model file before receiving the interaction request instead of encrypting the image model file after receiving the interaction request, so that the server can send the image model file to the second client immediately after receiving the interaction request. In this way, response efficiency of the second client can be improved, and a timely response effect of livestreaming can be achieved. In addition, the image model file of the first online streamer is encrypted once being received instead of being encrypted after the interaction request is received, so that sufficient time can be provided for the encryption process, and encryption can be performed by using an encryption algorithm with a relatively high degree of encryption, to increase the difficulty in decoding the image model file, thereby further reducing a risk of leakage of the image model file of the online streamer and improving the security of transmitting the image model file. The encrypted image model file and the target key are separately sent, and the server sends the target key only when the second client sends the decryption request, so that the target key is dynamically managed, and the difficulty in decoding the image model file is further increased. In addition, it is easy to use the method provided in this application, and transformation costs of clients are reduced.

The foregoing describes a schematic solution of an image model file transmission apparatus applied to a server in the embodiments. It should be noted that the technical solution of the image model file transmission apparatus applied to a server and the technical solution of the foregoing image model transmission file method applied to a server belong to the same concept. For details not described in detail in the technical solution of the image model file transmission apparatus applied to a server, references can be made to the descriptions of the technical solution of the foregoing image model file transmission method applied to a server.

Figure 11:
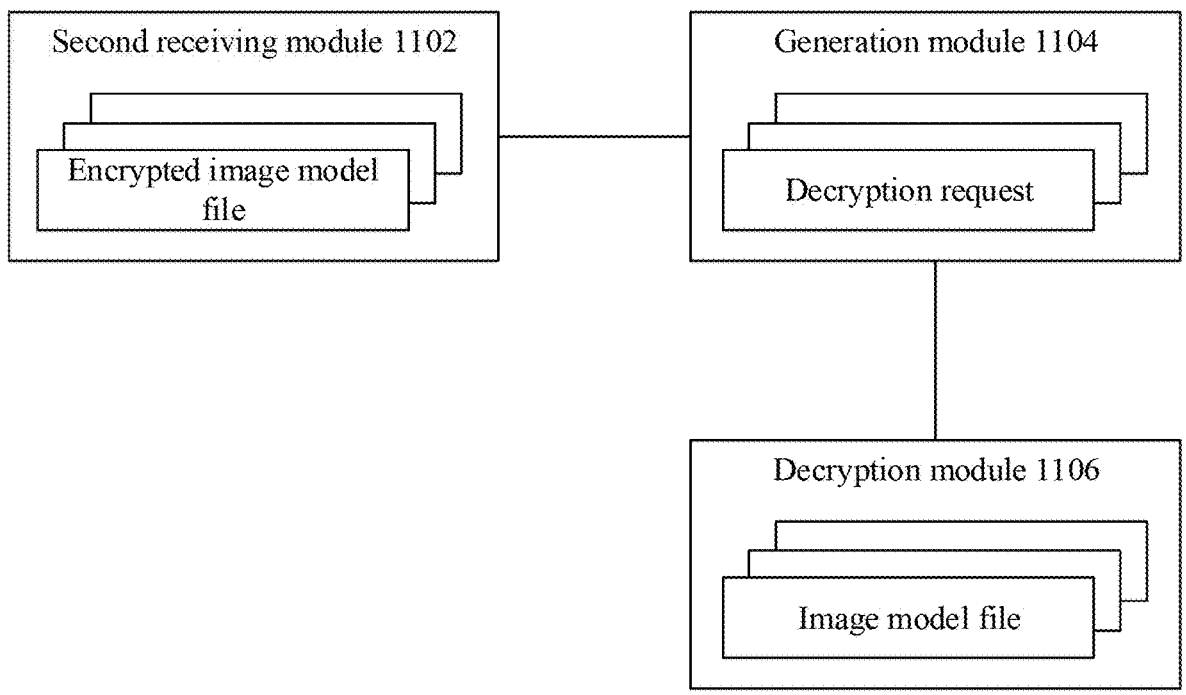
FIG. 11 is a schematic diagram illustrating a structure of another image model file transmission apparatus according to an embodiment of this application.

Corresponding to the method embodiments, this application further provides embodiments of an image model file transmission apparatus. FIG. 11 is a schematic diagram illustrating a structure of another image model file transmission apparatus according to an embodiment of this application. As shown in FIG. 11, the apparatus is applied to a second client and includes:
  a second receiving module 1102, configured to receive an encrypted image model file sent by a server, where the encrypted image model file is obtained by the server by encrypting an image model file of a first online streamer based on a target key;
  a generation module 1104, configured to generate a decryption request based on the encrypted image model file, and send the decryption request to the server; and
  a decryption module 1106, configured to decrypt the encrypted image model file based on the target key sent by the server based on the decryption request, to obtain the image model file.

In some embodiments, the apparatus further includes a query module, configured to:
  query whether the encrypted image model file is locally stored; and
  if no, generate an encrypted image model file obtaining request, and send the encrypted image model file obtaining request to the server.

In some embodiments, the apparatus further includes a rendering module, configured to:
  render an image of the first online streamer based on the image model file; and
  generate an interactive video stream of the first online streamer and a second online streamer based on the image of the first online streamer and an image of the second online streamer, whee the interactive video stream is used to display an interactive picture between the first online streamer and the second online streamer.

In some embodiments, the apparatus further includes a third sending module, configured to:
  send the interactive video stream to the server, where the interactive video stream is forwarded by the server to an audience client corresponding to the second online streamer.

In the image model file transmission apparatus provided in this application, the encrypted image model file sent by the server is received. The encrypted image model file is obtained by the server by encrypting the image model file of the first online streamer based on the target key. The decryption request is generated based on the encrypted image model file, and the decryption request is sent to the server. The encrypted image model file is decrypted based on the target key sent by the server based on the decryption request, to obtain the image model file. The image model file is encrypted, so that all image model files stored in a memory are encrypted files, which ensures that the image model file of the online streamer in the memory cannot be obtained and is securely used in the second client, thereby effectively reducing a risk of leakage of the image model file of the online streamer and improving the security of transmitting the image model file. The server completes encrypting the image model file before receiving the interaction request instead of encrypting the image model file after receiving the interaction request, so that the server can send the image model file to the second client immediately after receiving the interaction request. In this way, response efficiency of the second client can be improved, and a timely response effect of livestreaming can be achieved. In addition, the image model file of the first online streamer is encrypted once being received instead of being encrypted after the interaction request is received, so that sufficient time can be provided for the encryption process, and encryption can be performed by using an encryption algorithm with a relatively high degree of encryption, to increase the difficulty in decoding the image model file, thereby further reducing a risk of leakage of the image model file of the online streamer and improving the security of transmitting the image model file. The encrypted image model file and the target key are separately sent, and the server sends the target key only when the second client sends the decryption request, so that the target key is dynamically managed, and the difficulty in decoding the image model file is further increased. In addition, it is easy to use the method provided in this application, and transformation costs of clients are reduced.

The foregoing describes a schematic solution of an image model file transmission apparatus applied to a second client in the embodiments. It should be noted that the technical solution of the image model file transmission apparatus applied to a second client and the technical solution of the foregoing image model file transmission method applied to a second client belong to the same concept. For details not described in detail in the technical solution of the image model file transmission apparatus applied to a second client, references can be made to the descriptions of the technical solution of the foregoing image model file transmission method applied to a second client.

Figure 12:
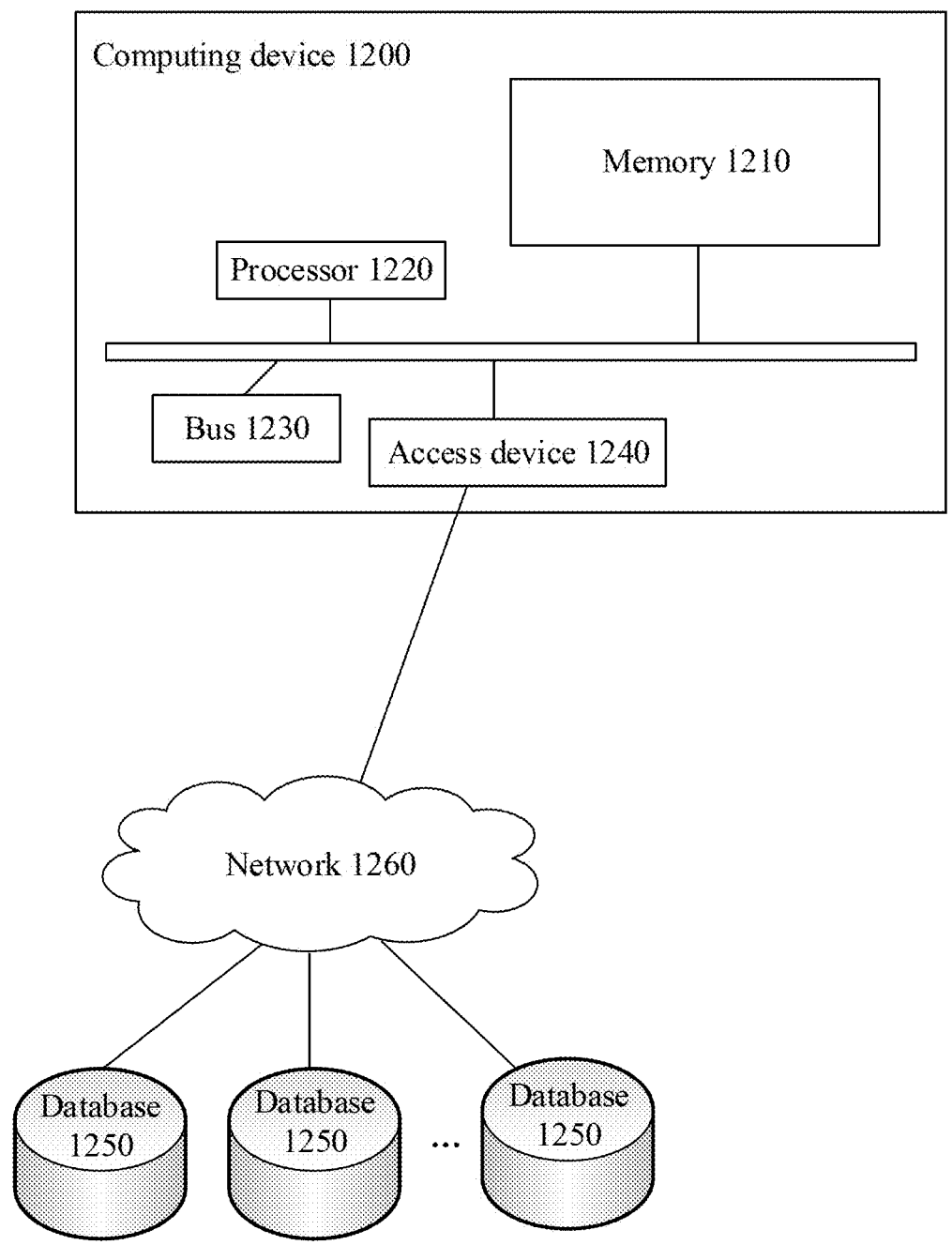
FIG. 12 is a block diagram illustrating a structure of a computing device according to an embodiment of this application.

FIG. 12 is a block diagram illustrating a structure of a computing device 1200 according to an embodiment of this application. Components of the computing device 1200 include but are not limited to a memory 1210 and a processor 1220. The processor 1220 and the memory 1210 are connected by using a bus 1230, and a database 1250 is configured to store data.

The computing device 1200 further includes an access device 1240 that enables the computing device 1200 to communicate via one or more networks 1260. Examples of these networks include a public switched telephone network (PSTN), a local area network (LAN), a wide area network (WAN), a private area network (PAN), or a combination of communications networks such as the Internet. The access device 1240 may include one or more of any type of wired or wireless network interface (for example, a network interface card (NIC)), for example, an IEEE 802.11 wireless local area network (WLAN) wireless interface, a Worldwide Interoperability for Microwave Access (WiMAX) interface, an Ethernet interface, a Universal Serial Bus (USB) interface, a cellular network interface, a Bluetooth interface, or a near field communication (NFC) interface.

In an embodiment of this application, the foregoing components of the computing device 1200 and other components not shown in FIG. 12 may also be connected to each other, for example, by using the bus. It should be understood that the block diagram illustrating the structure of the computing device shown in FIG. 12 is merely used as an example instead of a limitation on the scope of this application. A person skilled in the art may add or substitute other components as required.

The computing device 1200 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a still computing device such as a desktop computer or a PC. The computing device 1200 may be alternatively a mobile or still server.

The processor 1220 executes computer instructions to implement the steps of the image model file transmission method.

The foregoing describes a schematic solution of a computing device in the embodiments. It should be noted that the technical solution of the computing device and the technical solution of the foregoing image model file transmission method belong to the same concept. For details not described in detail in the technical solution of the computing device, references can be made to the descriptions of the technical solution of the foregoing image model file transmission method.

An embodiment of this application further provides a computer-readable storage medium. The computer-readable storage medium stores computer instructions, and the computer instructions are executed by a processor to implement the steps of the image model file transmission method.

The foregoing describes a schematic solution of a computer-readable storage medium in the embodiments. It should be noted that the technical solution of the storage medium and the technical solution of the foregoing image model file transmission method belong to the same concept. For details not described in detail in the technical solution of the storage medium, references can be made to the descriptions of the technical solution of the foregoing image model file transmission method.

Specific embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular execution order to achieve the desired results. In some implementations, multi-tasking and parallel processing can or may be advantageous.

The computer instructions include computer program code, which may be in a source code form, an object code form, an executable file, an intermediate form, or the like. The computer-readable medium may include any entity or apparatus capable of carrying the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in the specification are all preferred embodiments, and involved actions and modules are not necessarily mandatory to this application.

In the foregoing embodiments, descriptions of the embodiments have respective focuses. For a part that is not described in detail in an embodiment, references can be made to related descriptions in another embodiment.

The preferred embodiments of this application disclosed above are merely intended to help describe this application. The optional embodiments do not describe all details, and the present invention is not limited to the specific implementations. Clearly, many modifications and changes may be made based on the content of this application. The embodiments are selected and specifically described in this application to better explain the principle and actual application of this application, so that a person skilled in the art can better understand and use this application. This application is only subjected to the claims and the scope and equivalents thereof.

What is claimed is:

1. A method, applied to a server, the method comprising:
receiving an image model file of a first online streamer that is sent by a first client;
obtaining a target key, and encrypting the image model file based on the target key to obtain an encrypted image model file;
in response to determining that an interaction request for the first online streamer and a second online streamer is received, sending the encrypted image model file to a second client based on an online streamer identifier of the second online streamer that is carried in the interaction request;
in response to determining that a decryption request sent by the second client is received, sending the target key to the second client, wherein the target key is used by the second client to decrypt the encrypted image model file to obtain the image model file;
after the sending the target key to the second client, receiving an interactive video stream sent by the second client, wherein the interactive video stream is generated by the second client based on the image model file;
determining an audience identifier corresponding to the second online streamer; and
sending the interactive video stream to an audience client corresponding to the audience identifier, wherein the interactive video stream is used by the audience client to display an interactive picture between the first online streamer and the second online streamer.

2. The method according to claim 1, further comprising:
before the encrypting the image model file based on the target key to obtain the encrypted image model file,
scaling picture data in the image model file to obtain an updated image model file,
wherein the encrypting the image model file based on the target key to obtain the encrypted image model file comprises:
encrypting the updated image model file based on the target key to obtain the encrypted image model file.

3. The method according to claim 2, wherein the scaling picture data in the image model file to obtain the updated image model file comprises:
obtaining a preset scaling specification table, wherein the preset scaling specification table comprises at least one scaling specification; and
scaling the picture data in the image model file by using the scaling specification, to obtain the updated image model file with scaled picture data.

4. The method according to claim 1, wherein the sending the target key to the second client comprises:
checking the decryption request sent by the second client to determine whether the decryption request meets a preset decryption rule; and
in response to determining that the decryption request meets a preset decryption rule, sending the target key to the second client.

5. The method according to claim 4, wherein the decryption request carries a second-client public key, and
wherein the sending the target key to the second client comprises:
performing third encryption processing on the target key based on the second-client public key to obtain an encrypted target key; and
sending the encrypted target key to the second client.

6. The method according to claim 4, further comprising:
before the sending the target key to the second client,
in response to determining that the decryption request meets the preset decryption rule, extracting and recording file usage information of the second client that is carried in the decryption request, wherein the file usage information comprises at least one of a user identifier, a usage scenario, usage scope, a file usage identifier, and usage time that corresponding to the second client.

7. A non-transient computer-readable storage medium storing one or more programs, the one or more programs comprising instructions, which when executed by one or more processors of an electronic device, cause the electronic device to implement the steps of the method according to claim 1.

8. A computing device, comprising:
one or more processors;
a memory storing one or more programs configured to be executed by the one or more processors, the one or more programs comprising instructions for implementing the steps of the method according to claim 1.

9. The computing device according to claim 8, wherein the one or more programs further comprise instructions for:
before the encrypting the image model file based on the target key to obtain the encrypted image model file,
scaling picture data in the image model file to obtain an updated image model file,
wherein the encrypting the image model file based on the target key to obtain the encrypted image model file comprises:
encrypting the updated image model file based on the target key to obtain the encrypted image model file.

10. The computing device according to claim 9, wherein the scaling picture data in the image model file to obtain the updated image model file comprises:

obtaining a preset scaling specification table, wherein the preset scaling specification table comprises at least one scaling specification; and scaling the picture data in the image model file by using the scaling specification, to obtain the updated image model file with scaled picture data.

11. A method, applied to a second client, the method comprising:

receiving an encrypted image model file sent by a server, wherein the encrypted image model file is obtained by the server by encrypting an image model file of a first online streamer based on a target key;

generating a decryption request based on the encrypted image model file, and sending the decryption request to the server;

decrypting the encrypted image model file based on the target key sent by the server based on the decryption request, to obtain the image model file;

after the decrypting the encrypted image model file based on the target key sent by the server based on the decryption request, to obtain the image model file, rendering an image of the first online streamer based on the image model file; and generating an interactive video stream of the first online streamer and a second online streamer based on the image of the first online streamer and an image of the second online streamer, wherein the interactive video stream is used to display an interactive picture of the first online streamer and the second online streamer.

12. The method according to claim 11, further comprising: before the receiving the encrypted image model file sent by the server, querying whether the encrypted image model file is locally stored; and in response to determining that the encrypted image model file is not locally stored, generating an encrypted image model file obtaining request, and sending the encrypted image model file obtaining request to the server.

13. The method according to claim 11, further comprising: after the generating the interactive video stream of the first online streamer and the second online streamer based on the image of the first online streamer and the image of the second online streamer, sending the interactive video stream to the server, wherein the interactive video stream is forwarded by the server to an audience client corresponding to the second online streamer.

14. A non-transient computer-readable storage medium storing one or more programs, the one or more programs comprising instructions, which when executed by one or more processors of an electronic device, cause the electronic device to implement the steps of the method according to claim 11.

15. A computing device, applied to a second client, the computing device comprising:

one or more processors, and a memory storing one or more programs configured to be executed by the one or more processors, the one or more programs comprising instructions for:

receiving an encrypted image model file sent by a server, wherein the encrypted image model file is obtained by the server by encrypting an image model file of a first online streamer based on a target key;

generating a decryption request based on the encrypted image model file, and sending the decryption request to the server;

decrypting the encrypted image model file based on the target key sent by the server based on the decryption request, to obtain the image model file;

after the decrypting the encrypted image model file based on the target key sent by the server based on the decryption request, to obtain the image model file, rendering an image of the first online streamer based on the image model file; and generating an interactive video stream of the first online streamer and a second online streamer based on the image of the first online streamer and an image of the second online streamer, wherein the interactive video stream is used to display an interactive picture of the first online streamer and the second online streamer.

16. The computing device according to claim 15, wherein the one or more programs further comprise instructions for: before the receiving the encrypted image model file sent by the server, querying whether the encrypted image model file is locally stored; and in response to determining that the encrypted image model file is not locally stored, generating an encrypted image model file obtaining request, and sending the encrypted image model file obtaining request to the server.

17. The computing device according to claim 15, wherein the one or more programs further comprise instructions for: after the generating the interactive video stream of the first online streamer and the second online streamer based on the image of the first online streamer and the image of the second online streamer, sending the interactive video stream to the server, wherein the interactive video stream is forwarded by the server to an audience client corresponding to the second online streamer.

* * * * *